(12) United States Patent
Dao et al.

(10) Patent No.: US 10,326,854 B2
(45) Date of Patent: Jun. 18, 2019

(54) METHOD AND APPARATUS FOR DATA CACHING IN A COMMUNICATIONS NETWORK

(71) Applicants: Ngoc Dung Dao, Ottawa (CA); Hang Zhang, Nepean (CA)

(72) Inventors: Ngoc Dung Dao, Ottawa (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 280 days.

(21) Appl. No.: 14/967,807

(22) Filed: Dec. 14, 2015

(65) Prior Publication Data
US 2017/0171114 A1    Jun. 15, 2017

(51) Int. Cl.
*G06F 15/16*   (2006.01)
*H04L 29/08*   (2006.01)

(52) U.S. Cl.
CPC ............... *H04L 67/2842* (2013.01)

(58) Field of Classification Search
CPC .................................................. H04L 49/901
See application file for complete search history.

(56) References Cited

U.S. PATENT DOCUMENTS

| | | | | |
|---|---|---|---|---|
| 7,437,364 | B1* | 10/2008 | Fredricksen | G06F 16/9574 |
| 2002/0116585 | A1* | 8/2002 | Scherr | H04L 67/2852 |
| | | | | 711/133 |
| 2004/0170176 | A1* | 9/2004 | Kadambi | H04L 12/46 |
| | | | | 370/392 |
| 2006/0155759 | A1* | 7/2006 | Ramachandran | H04L 67/02 |
| 2007/0121652 | A1* | 5/2007 | Wehren | H04L 47/35 |
| | | | | 370/401 |
| 2010/0318484 | A1* | 12/2010 | Huberman | G06Q 30/02 |
| | | | | 706/46 |
| 2013/0080611 | A1* | 3/2013 | Li | H04N 21/222 |
| | | | | 709/223 |
| 2013/0138889 | A1* | 5/2013 | Chockler | G06F 12/0866 |
| | | | | 711/129 |
| 2013/0204961 | A1* | 8/2013 | Fliam | H04L 67/2885 |
| | | | | 709/214 |

(Continued)

OTHER PUBLICATIONS

Fielding, et al., "Hypertext Transfer Protocol HTTP/1.1: Caching in HTTP," IETF RFC 2616, «http://www.w3.org/Protocols/rfc2616/rfc2616-sec13.html».

(Continued)

*Primary Examiner* — Phyllis A Book

(57) ABSTRACT

Methods and apparatus for managing data content among in-network caches of a communication network are provided. In some embodiments, multiple registers are maintained for indexing cached data content. Different data content is indexed in different registers based on parameters such as popularity or content freshness. Customized popularity estimators can be applied to each register, and data content may be indexed by different registers as parameters change. Less popular content can be removed from caches as required. In some embodiments, caches can be grouped into clusters, and deletion of data content from a cache may be modified or inhibited if the cluster still requires a copy of that data content. Data content can be moved between caches of a cluster based on popularity.

22 Claims, 16 Drawing Sheets

(56) References Cited

U.S. PATENT DOCUMENTS

| | | | |
|---|---|---|---|
| 2014/0164547 A1* | 6/2014 | Fullagar | H04L 65/4084 709/213 |
| 2016/0217141 A1* | 7/2016 | De Vleeschauwer | G06Q 50/01 |
| 2017/0315918 A1* | 11/2017 | Nikitaki | G06F 12/0888 |

OTHER PUBLICATIONS

R. Fielding, M. Nottingham, J. Reschke, "Hypertext Transfer Protocol (HTTP/1.1): Caching," IETF RFC 7234, Jun. 2014.
Q. Huang, K. Birman, R. Van Renesse, W. Lloyd, S. Kumar, and H. Li, "An analysis of Facebook photo caching," Proceedings of SOSP 2013, 2013.
P. Gill, M. Arlitt, Z. Li, and A. Mahanti, "YouTube traffic characterization: A view from the edge," Proc. of ACM IMC'07, Oct. 24-26, 2007.
S. Gadde, M. Rabinovich, and J. Chase, "Reduce, reuse, recycle: An approach to building large Internet caches," Proc. of Workshop on Hot Topics in Operating Systems, Apr. 1997, pp. 93-98.
Ari Luotonen and Kevin Altis, "World-wide Web proxies," In Computer Networks and ISDN systems, First International Conference on the World-Wide Web, Elsevier Science BV, 1994, pp. 147-154.
Steven Glassman, "A caching relay for the world wide web," Proc. First International Conference on the World-Wide Web, CERN, Geneva, Switzerland, May 1994.
N. T. Spring and D. Wetherall, "A protocol-independent technique for eliminating redundant network traffic," Proc. SIGCOMM, 2000, pp. 87-95.
Shanmugam, K.; Golrezaei, N.; Dimakis, A.G.; Molisch, A.F.; Caire, G., "FemtoCaching: Wireless Content Delivery Through Distributed Caching Helpers," IEEE Transactions on Information Theory, Dec. 2013, pp. 8402-8413, vol. 59, No. 12.
K. Poularakis, G. Iosifidis, L. Tassiulas, "Approximation Algorithms for Mobile Data Caching in Small Cell Networks", IEEE Transactions on Communications, 2014, vol. 62, issue 10.
E. Baştuğ, M. Bennis, M. Kountouris, and M. Debbah, "Cache-enabled small cell networks: Modeling and tradeoffs," EURASIP Journal on Wireless Communications and Networking, 2015, pp. 1-11.
Jie Dai; Zhan Hu; Bo Li; Jiangchuan Liu; Baochun Li, "Collaborative hierarchical caching with dynamic request routing for massive content distribution," INFOCOM, 2012 Proceedings IEEE , Mar. 25-30, 2012, pp. 2444-2452.
M. S. Elbamby, M. Bennis, W. Saad, and M. Latva-Aho, "Content-aware user clustering and caching in wireless small cell networks," 11th International Symposium on Wireless Communication Systems (ISWCS), Aug. 2014, Barcelona, Spain.

Ejder Baştuğ, Mehdi Bennis and Mérouane Debbah, "Transfer Learning Approach for Cache-Enabled Wireless Networks," Proc. 2015 IEEE ICC.
Y Guan, Y Xiao, H Feng, CC Shen, LJ Cimini Jr, "MobiCacher: Mobility-Aware Content Caching in Small-Cell Networks," Proc. 2014 IEEE Globecom Conf., 2014.
Jun He, Honghai Zhang, Baohua Zhao, and Sampath Rangarajan, "A collaborative framework for in-network video caching in mobile networks," Proc. of 10th IEEE Sensor, Mesh and Ad Hoc Communications and Networks (SECON), 2013.
Imbrenda, Claudio, Muscariello, Luca and Rossi, Dario, "Analyzing Cacheable Traffic in ISP Access Networks for Micro CDN applications via Content-Centric Networking," 1st ACM SIGCOMM Conference on Information-Centric Networking (ICN-2014), Sep. 2014, Paris, France.
Borst, S.; Gupta, V.; Walid, A., "Distributed Caching Algorithms for Content Distribution Networks," 2010 Proceedings IEEE INFOCOM, Mar. 14-19, 2010.
Haiyong Xie; Guangyu Shi; Pengwei Wang, "TECC: Towards collaborative in-network caching guided by traffic engineering," 2012 Proceedings IEEE INFOCOM, Mar. 25-30, 2012, pp. 2546-2550.
Shirin Nilizadeh, Sonia Jahid, Prateek Mittal, Nikita Borisov, and Apu Kapadia, "Cachet: A Decentralized Architecture for Privacy Preserving Social Networking with Caching," Proceedings of the 8th ACM International Conference on Emerging Networking Experiments and Technologies (CoNEXT '12), Dec. 10-13, 2012, pp. 337-348, Nice, France.
Xu Cheng; Dale, C.; Jiangchuan Liu, "Statistics and Social Network of YouTube Videos," Quality of Service, 2008, IWQoS 2008, 16th International Workshop, Jun. 2-4, 2008, pp. 229-238.
G. Szabo and B. A. Huberman, "Predicting the popularity of online content," Commun. ACM, 2010, pp. 80-88.
J. Mogul and P. Leach, "Simple Hit-Metering and Usage-Limiting for HTTP," IETF RFC 2227, Oct. 1997.
R. Krishnan, Dilip Krishnaswamy, D. R. Lopez, Peter Willis, and Asif Qamar, "An Open NFV Architectural Framework for Virality Based Content Caching," Internet Research Task Force (IRTF), Internet Draft, Jul. 21, 2014, Expires: Dec. 2014.
ETSI, "Content Delievery Network (CDN) Architecture," TS 182 019 V3.1.2, TISPAN, Sep. 2011.
Ahlehagh, H. and Dey, S., "Video-Aware Scheduling and Caching in the Radio Access Network," Networking, IEEE/ACM Transactions on Networking, Oct. 2014, vol. 22, No. 5, pp. 1444-1462.
S. Fayazbakhsh, Y. Lin, A. Tootoonchian, A. Ghodsi, T. Koponen, B. Maggs, K. Ng, V. Sekar, and S. Shenker, "Less pain, most of the gain: Incrementally deployable ICN," in ACM SIGCOMM, 2013.
H. Zhang et al., "5G wireless network: MyNET and SONAC," in IEEE Network, vol. 29, No. 4, pp. 14-23, Jul.-Aug. 2015.
International Search Report dated Feb. 28, 2017 for corresponding International Application No. PCT/CN2016/109745 filed Dec. 13, 2016.

* cited by examiner

METHOD AND APPARATUS FOR DATA CACHING IN A COMMUNICATIONS NETWORK

FIELD OF THE INVENTION

The present invention pertains to the field of network communications, and in particular to methods and apparatus for data caching in a communications network.

BACKGROUND

In-network caching typically refers to the storage of frequently accessed data content such as web pages, audio/video content, and images in a communication network to reduce data traffic between a server and a user equipment (UE). Information that has been previously stored in the cache can be retrieved from the cache rather than from the server, thus providing faster service when the cache is closer to the UE than the origin server. However, cache memories are usually small in order to be cost-effective, making efficient management and use of the cache memory a challenging task.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for managing cache memory in a communications network. In accordance with an embodiment of the present invention, there is provided a method for managing data content items in a communication network, the method comprising: maintaining a plurality of registers, each register of the plurality of registers for indexing data content items stored in a first cache; and associating a data content item stored in the first cache to one of the plurality of registers based on one or more parameters associated with the data content item. In some embodiments, the method may further comprise providing one or a plurality of popularity estimators, each associated with a respective one of the plurality of registers and configured to estimate popularity of data content items associated to said respective one of the plurality of registers. In some embodiments, the first cache belongs to a cache cluster comprising a plurality of caches, and the method further comprises selecting one of the plurality of caches for storing a further data content item based at least partially on popularity of the further data content item, and initiate storage of the further data content item in the selected one of the plurality of caches.

In accordance with another embodiment of the present invention, there is provided a method for managing cached data content in a communication network, the method comprising: identifying a cache cluster comprising a plurality of caches located within the communication network, each cache configured to store data content items for providing to User Equipment (UEs) via the communication network; upon determining a requirement to remove data content from the cache cluster, identifying a data content item, stored in a first cache of the cache cluster, having a popularity below a predetermined threshold; determining whether at least one other cache of the cache cluster currently stores a copy of the data content item; and deleting the data content item from the first cache or one of said at least one other caches when said at least one other cache of the cache cluster currently stores the copy of the data content item. A corresponding controller apparatus may also be provided.

In accordance with another embodiment of the present invention, there is provided a method for managing cached data content in a communication network, the method comprising: identifying a cache cluster comprising a plurality of caches located within the communication network, each of the plurality of caches configured to store data content items for providing to User Equipment (UEs) via the communication network; upon determining a requirement to remove data content from a first cache of the cache cluster, identifying a data content item, stored in the first cache, having a local popularity below a predetermined threshold from a perspective of the first cache; determining a cluster-wide popularity of the data content item from a perspective of the cache cluster; when the cluster-wide popularity of the data content item is above a second predetermined threshold and at most a predetermined number of the plurality of caches hold copies of the data content item, either: storing the data content item in a memory location of the cache cluster other than said first cache and deleting the data content item from the first cache; or inhibiting deletion of the data content item from the first cache. In some embodiments in relation to the above-described method, the memory location is another cache of the plurality of caches. In some embodiments the above-described method further includes selecting said another one of the plurality of caches as a cache storing a second data content item having a cluster-wide popularity lower than the cluster wide popularity of the data content item, and deleting the second data content item from said another one of the plurality of caches. In some embodiments in relation to the above-described method, the predetermined number is equal to one. In some embodiments in relation to the above-described method, the local popularity is a relative popularity among data content items stored in the first cache. In some embodiments in relation to the above method, the cluster-wide popularity is a relative popularity among data content items stored in the cache cluster. In some embodiments in relation to the above-described method, the local popularity of the data content item is based on requests for the data content item received by the first cache, and the cluster-wide popularity of the data content item is based on requests for the data content item received by the cache cluster. A corresponding controller apparatus may also be provided.

In accordance with another embodiment of the present invention, there is provided a method for managing cached data content in a communication network, the method comprising: identifying a plurality of caches located within the communication network, each of the plurality of caches configured to store data content items for providing to User Equipment (UEs) via the communication network, the plurality of caches including at least one lower level cache and at least one higher level cache, the at least one lower level cache located between the at least one higher level cache and said UEs; estimating a popularity of a data content item stored in the cache cluster; and moving the data content item between the at least one higher level cache and the at least one lower level cache based on said estimated popularity. In some embodiments in relation to the above-described method, moving the data content item comprises moving the data content item from a lower level cache to the at least one higher level cache when popularity of the data content item is below a predetermined threshold and need to free memory space in the lower level cache is identified. In some embodiments, the above-described method further comprises deleting the data content item from the at least one higher level cache when the data content item is present in each of said lower level caches. A corresponding controller apparatus may also be provided.

In accordance with another embodiment of the present invention, there is provided a controller for managing data content items in a communication network, the controller comprising: a plurality of registers, each register of the plurality of registers configured for indexing data content items stored in a first cache; and a processor configured to associate a data content item stored in the first cache to one of the plurality of registers based on one or more parameters associated with the data content item. In some embodiments, the controller may further comprise one or a plurality of popularity estimators, each associated with a respective one of the plurality of registers and configured to estimate popularity of data content items associated to said respective one of the plurality of registers.

In accordance with another embodiment of the present invention, there is provided a controller for managing cached data content in a communication network, the controller comprising processor operatively coupled to memory and a network interface, the controller configured to: identify a cache cluster comprising a plurality of caches located within the communication network, each of the plurality of caches configured to store data content items for providing to User Equipment (UEs) via the communication network; upon determining a requirement to remove data content from a first cache of the cache cluster, identify a data content item, stored in the first cache, having a local popularity below a predetermined threshold from a perspective of the first cache; determine a cluster-wide popularity of the data content item from a perspective of the cache cluster; when the cluster-wide popularity of the data content item is above a second predetermined threshold and at most a predetermined number of the plurality of caches hold copies of the data content item, either: store the data content item in a memory location of the cache cluster other than said first cache and delete the data content item from the first cache; or inhibiting deletion of the data content item from the first cache.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Communications networks typically include a plurality of servers and nodes that are communicatively interconnected to serve the requests of various UEs connected to the network. One or more cache memories may be deployed at various locations or nodes of the communications network in order to temporarily and locally store frequently accessed data content, which may then be re-used in a subsequent request without requiring retransmission from the original source location. Some benefits of caching include the reduction of bandwidth consumption over the communications network, reduction of request processing over the network, and reduction of latency times required for fetching desired user content (i.e. content retrieval). Unfortunately, cache memories are typically limited in size due to their cost, requiring efficient management of data content within the cache to be effective. This becomes a particularly difficult as the size of the communications network, and the number of UEs connected to the network increases.

Figure 1:
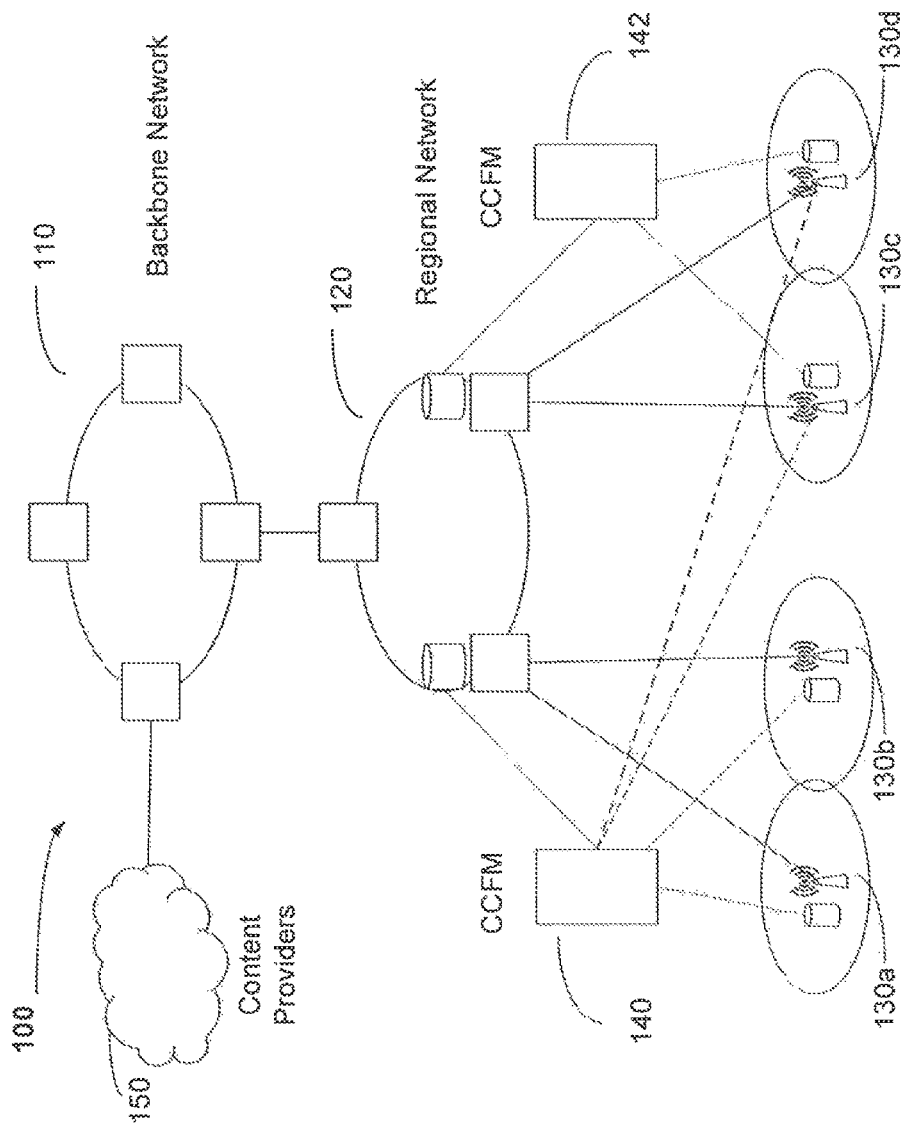
FIG. 1 is a schematic diagram of a communications network, according to an embodiment of the present invention.

FIG. 1 is a schematic diagram of a communications network 100, according to an embodiment of the present invention. The communications network 100 comprises a backbone network 110, a regional network 120 communicatively coupled to the backbone network 110, and a plurality of access nodes 130*a*-130*d* communicatively coupled to the regional network 120. The backbone network 110 and regional network 120 further comprise a plurality of individual nodes/servers, as shown. The access nodes 130*a*-130*d* may comprise for example, Radio Access Nodes (RAN), base stations, eNodeB's, transceivers or antennas.

One or more UEs (not shown) may be communicatively coupled to any of the access nodes 130a-130d in order to transmit or receive data content from the communications network 100, for example via wireless interface. Content Providers 150 are communicatively coupled to the backbone network 110 to provide data content to UEs upon request via the backbone network 110, regional network 120 and access nodes 130a-130d. A Caching, Computing and Forwarding Manager (CCFM) 140 is communicatively coupled to regional network 120 and access nodes 130a-130d. In other embodiments (not shown), communications network 100 may comprise a plurality of CCFM modules, with each CCFM module communicatively coupled to a regional network, other CCFM modules, and access nodes in a specific geographical region. Operation of CCFM 140 will be described in further detail below.

FIG. 1 further illustrates an additional optional CCFM module 142. Multiple CCFM modules may be provided for example when a large network is subdivided into smaller networks, each smaller network being associated with its own CCFM. The multiple CCFM modules may be communicatively coupled to each other.

Figure 2:
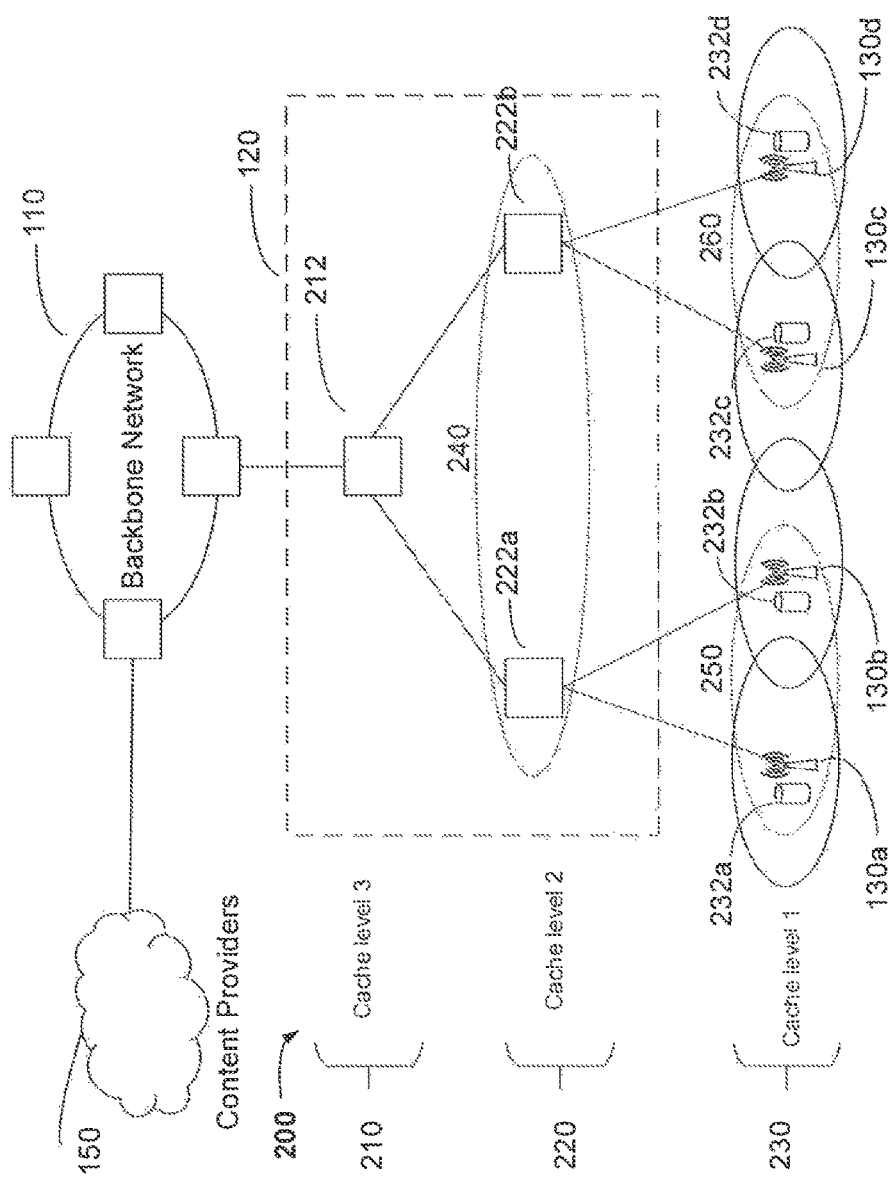
FIG. 2 illustrates a hierarchical cache architecture of the communications system shown in FIG. 1, according to an embodiment of the present invention.

FIG. 2 illustrates a hierarchical cache architecture 200 of the communications system 100 shown in FIG. 1, according to an embodiment of the present invention. The hierarchical cache architecture 200 includes various cache memories that are deployed at various locations of the communications network 100's components as shown. The regional network 120 further includes a third (i.e. highest) cache level 210 with cache 212, and a second cache level 220 with cache 222a and cache 222b. A first (i.e. lowest) cache level 230 includes cache 232a deployed at access node 130a, cache 232b deployed at access node 130b, cache 232c deployed at access node 130c, and cache 232d deployed at access node 130d. As shown in FIG. 2, the third cache level 210 is relatively closer to the backbone network 110 and content providers 150, the first cache level 230 is relatively closer to any UE's that may be communicatively coupled to access nodes 130a-130d, and the second cache level 220 is physically intermediate the first and third cache levels 230, 210.

As further shown in FIG. 2, individual caches 222a, 222b, 232a, 232b, 232c, and 232d may be grouped as cache clusters. A first cluster 240 consisting of cache 222a and cache 222b, a second cluster 250 includes cache 232a and cache 232b, and a third cluster 260 consisting of cache 232c and cache 232d. Each cache cluster 240, 250, 260 is configured to operate in at least some aspects as a unitary cache memory storing the contents of the component caches included therein. Operation of cache clusters 240, 250, 260 and their component caches 222a, 222b, 232a, 232b, 232c, and 232d may be performed concurrently. In certain embodiments (not shown), a cache cluster may include a controller located at one or more of the component caches, external to the component caches, or a combination thereof. Operation of a cache cluster may include removing data content from the cache cluster in a similar manner as to how data content is removed from component caches. The cache cluster may modify or inhibit removal of a data content item from component caches if that content item is still required by the cache cluster.

As an operational example, a UE (not shown) communicatively coupled to access node 130a may request data content from content provider 150. In response, content provider 150 transmits the data content to the UE through backbone network 110, regional network 120, and access node 130a. The data content may then be stored in at least one of first cache level 230, second cache level 220, and third cache level 210 during transmission to the UE. If the same UE, or another UE, subsequently requests the same data content, it can be transmitted from the cache level in which it was stored instead of from the content provider 150. In this way, the delivery path and latency time to deliver the data content is reduced.

Figure 3:
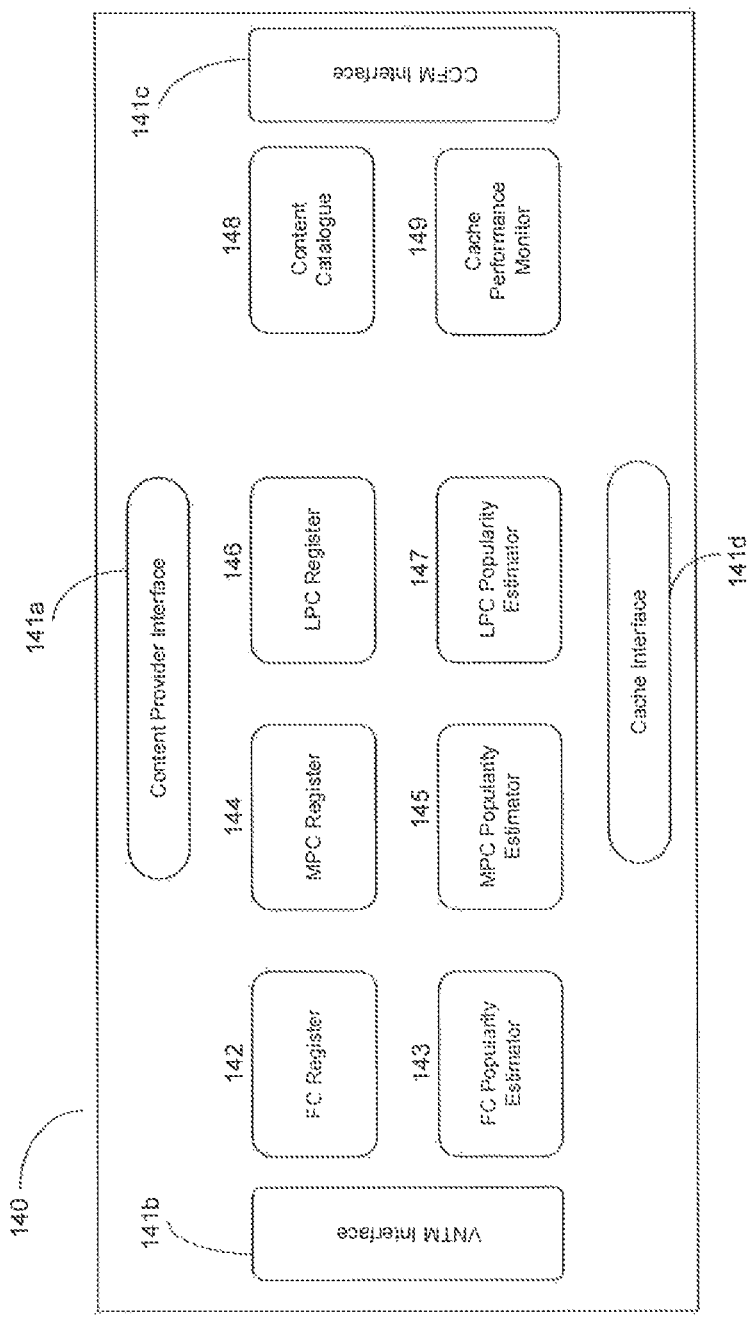
FIG. 3 is a functional block diagram of the controller shown in FIG. 1, according to an embodiment of the present invention.

FIG. 3 is a functional block diagram of CCFM 140 shown in FIG. 1, according to an embodiment of the present invention. CCFM 140 includes various interface modules 141 including a Content Provider interface 141a, a virtual network topology manager interface 141b, a CCFM interface 141c, and a Cache interface 141d. CCFM 140 further comprises a Fresh Content (FC) register 142, an FC popularity estimator 143, a Most Popular Content (MPC) register 144, an MPC popularity estimator 145, a Least Popular Content (LPC) register 146, a LPC popularity estimator 147, a content catalogue 148, and a cache performance monitor 149. It is noted that the CCFM may also include other functionalities not illustrated.

The CCFM 140 is communicatively coupled via the cache interface 141d to the first cache level 230, second cache level 220, and third cache level 210 as shown in FIG. 2 (not shown in FIG. 3) in order to manage storage of data content within individual caches 212, 222a, 222b, 232a, 232b, 232c, and 232d. The CCFM 140 may also comprise various registers which serve as catalogs or indexes for looking up the location of specific data content throughout the communications network 100. Each register may belong to a certain category that indexes data content having a certain criteria or characteristic. The registers may each comprise one or more entries (or pointers, references) each identifying the location of a specific data content within individual caches 212, 222a, 222b, 232a, 232b, 232c, and 232d. The entries within registers may also be sorted, arranged, or organized according to certain criteria, in order to find data content corresponding to a desired criteria within each register. A data content item can be associated with a register by indexing the data content item in the register.

Referring again to FIG. 3, the content catalogue 148 is a database of all data content stored in cache levels 210, 220, 230, and/or individual caches 212, 222a, 222b, 232a, 232b, 232c, and 232d. The content catalogue may also indexes data content that is not cached in the particular cache managed by this CCFM. Such content can be retrieved from other caches managed by other CCFMs. The index of such data content may include an indication of other caches storing the same data content. Entries in content catalogue 148 may be labelled for example, by content name, content description, content cache location, content popularity, hit count, miss count, and timer. Hit count is a counter indicating the number of times a particular item of data content has been accessed from a certain cache. Miss count is a counter indicating the number of times an item of data content has been requested but not found in the cache. Hit and miss counts can be kept for items of data content and/or for particular content service providers. Timer may indicate the remaining time in which the data content remains valid. Content popularity is a variable indicating the relative popularity of the data content within a geographical area or region of the network. Content cache location identifies where the data content is stored within the individual cache(s).

The cache performance monitor 149 observes and reports various parameters of cache levels 210, 220, 230, and/or individual caches 212, 222a, 222b, 232a, 232b, 232c, and 232d. For example, cache performance monitor 149 may monitor the number of hits or misses for a particular content provider, content category (e.g. movie, music, images) and cache location, where a hit may be defined as a specific request for a particular data content item in a geographical location (or cache), and a miss defined as a request for another data content item in the same location, or a request for a particular data content item that was not found in the cache. The cache performance monitor 149 can also monitor storage capacity of various caches or content providers, frequency of content replacement within individual caches, and outgoing traffic volume from individual caches.

FC register 142 is an index for newly arrived data content to the CCFM 140. For example, new data content may be sent to CCFM 140 in response to a UE request for the new data content. MPC register 144 is an index for data content that is relatively more popular or accessed at a greater rate. LPC register 146 is an index for data content that is relatively less popular or accessed at a lower rate. As will be discussed and illustrated in further detail below, the use of multiple registers for categorizing and indexing data content in individual caches may improve management and speed in delivering various data content to UEs.

FC popularity estimator 143, MPC popularity estimator 145, and LPC popularity estimator 147 are functional modules that estimate the popularities of data content referenced by entries in the FC register 142, MPC register 144, and LPC register 146, respectively. For example, popularity may be defined by the number of times a particular item of data content has been accessed, or the frequency at which the data content entry has been used or accessed. Alternatively, the popularity of a data content item may be defined based on the amount of time elapsed since that data content item was last accessed. The popularity of data content items may be defined in absolute terms or in relative terms. For example, more recently accessed data content may be deemed more popular than less recently accessed data content. The FC popularity estimator 143, MPC popularity estimator 145, and LPC popularity estimator 147 may comprise different algorithms or processing functions to provide different treatment of statistics for determining popularity for its respective register. Furthermore, popularity estimators can be configured to perform spatio-temporal popularity estimation. For example, popularity estimators can estimate popularity in different geographic locations, network locations, different times of day or week, or the like, or a combination thereof.

Popularity estimators may be implemented in a centralized or distributed manner. For example, a FC popularity estimator can operate at the content service provider server. In this case, when new content is introduced to the content service provider, the FC popularity estimator estimates popularity of the content and attaches meta-information to the content indicative of estimated popularity.

In some embodiments, distributed popularity estimation can be implemented by storing popularity estimates of content in registers, such as MPC and LPC register 144, 146, located at the physical caches 212, 222a, 222b, 232a, 232b, 232c, and 232d holding said data content. As such, different popularity estimates may be stored at different physical caches. The popularity estimates stored at different caches can be reported, for example periodically or on request, to a CCFM, such as a CCFM 140 of FIG. 1.

As will be illustrated in the examples below, the use of multiple indexes (such as FC register 142, MPC register 144, and LPC register 146, for example) may allow for more effective processing, for example by their respective popularity estimators. For example, when a first register is accessed at a relatively higher rate than a second register, the second register need not be accessed each and every time the first register is accessed. Thus entries in the second register need not be processed unnecessarily. For example, the FC register 142 may be accessed by the FC popularity estimator 143 at a higher rate than the LPC register 146 is accessed by the LPC popularity estimator 147. Furthermore, the LPC register 146 may include a large number of entries. Therefore it is desirable to avoid having to deal with content of the LPC register 146 when only entries of the FC register 142 are of current interest. The FC popularity estimator 147, MPC popularity estimator 145, and LPC popularity estimator 147 may be operated at different times, frequencies and/or under different circumstances. Furthermore, entries that refer to data content items can be moved between registers based on output of the popularity estimators. Entries that refer to data content items can be referred to as references to said data content items. For example, when the MPC popularity estimator 143 indicates that a data content item has adequately low popularity, the corresponding reference for this data content item can be moved to the LPC register 146. Conversely, when the LPC popularity estimator 147 indicates that a data content item has adequately high popularity, the corresponding reference for this content item can be moved to the MPC register 144. In this way, the data content items themselves do not need to be moved in order to sort them according to relative popularity. As such, parameters associated with a data content item, such as popularity or "freshness" or time since introduction of the data content item, can be used to determine which register currently indexes the data content. These parameters can be updated dynamically, for example in response to output of the popularity estimators.

In various embodiments of the present invention (not shown), different types of processing, such as different popularity estimation routines, can be performed on different registers (such as FC register 142, MPC register 144, and LPC register 146, for example). As such, the processing of register data can be individualized and customized for each register, and different popularity estimators operate in different manners. For example, estimating popularity of data content associated with entries in the FC register 142 may be performed using a relatively fast data processing routine. This data processing routine may be simple and efficient, thereby allowing popularity of new data content to be evaluated at a high frequency in order to keep up with a relatively high volume of new data content when using limited data processing resources. Further, this data processing routine may operate on access statistics collected over a relatively short period of time in order to estimate popularity quickly. As another example, estimating popularity of data content associated with entries in the MPC register 144 may be performed using a relatively more involved and more accurate data processing routine. This data processing routine may operate on access statistics collected over a relatively long period of time to provide for reliable content popularity estimation, thereby allowing popularity of this type of content to be more reliably evaluated. Since the data content associated with the MPC register 144 is expected to be somewhat persistent, and relatively less common than the data content associated with the LPC register 146, the popularity of the data content associated with the MPC register 144 can be estimated using relatively more processing-intensive techniques. As yet another example, estimating popularity of data content associated with the LPC register 146 may be performed using a relatively efficient data processing routine operating on the entries within the LPC register 146. This data processing routine may be less involved than that of the MPC register 144, but may operate on access statistics collected over a relatively longer period of time than that of the FC register 142 to provide for reliable content popularity estimation, thereby allowing popularity of this type of content to be reliably but efficiently evaluated, due to the expected higher volume of less popular content relative to more popular content.

In embodiments of the present invention, registers such as the MPC and LPC registers 144, 146 can be further configured to classify data content based on a more finely grained popularity scale. For example, entries in the MPC register 144 may include a popularity field which assigns one of N popularity levels to each entry. Entries in the LPC register 147 may also include a popularity field. The entries within each register can therefore be arranged or fully or partially sorted to rank the relative popularities of their corresponding data content. For example, the most popular data content may have a corresponding entry at the top of the MPC register 144, while the least popular data content may have a corresponding entry at the bottom of the LPC register 146. Entries may be ranked by allocating each entry to one of N bins corresponding to N popularity levels.

In embodiments of the present invention, entries within the MPC and LPC registers 144, 146 may further include information regarding their corresponding data content. The information may include an indication of the originating content service provider for the data content item, or meta-information describing one or more aspects of the data content, such as subject matter aspects.

Interface modules 141 are used by CCFM 140 to communicate with other functional components in the communications system 100. Content Provider interface 141a is directly or indirectly communicatively coupled to content provider 150 in order to obtain content meta information associated with certain data content (e.g. content type, "time to live", encoding formats, content type, etc.), and to send charging information to the content providers 150. Virtual network topology manager (VNTM) interface 141b is communicatively coupled to a virtual network topology manager. For example, the virtual network topology manager is configured to deploy network resources to instantiate the various caches and cache controllers at desired network locations. The caches and cache controllers can be deployed using Network Function Virtualization (NFV), Software Defined Topology (SDT), and/or Software Defined Protocols (SDP). For example, to receive information such as assigned resource usage (of physical cache locations, memory sizes, and computing resources) and UE-cache associations (for example radio node-cache connection matrix information). CCFM interface 141c is communicatively coupled to other CCFM modules (not shown) to exchange various information. Communications network 100 for example may comprise additional CCFM modules, including higher level CCFM modules, and peer CCFM modules which may manage certain clusters. CCFM 140 may for example exchange charging information such as: content service provider name, content object name, content size, number of hits, number of misses and resource usage statistics (memory and computing) with higher level CCFM modules, and content object information, content popularity, and cache hit/miss performance information with peer CCFM modules.

Cache interface 141d is communicatively coupled to individual caches 212, 222a, 222b, 232a, 232b, 232c, and 232d in order for CCFM 140 to manage store, and update data content within the caches. For example, CCFM 140 may send commands to delete unpopular data content, or to copy certain data content to other individual cache(s), and to receive memory usage information (i.e. remaining storage capacity) and requests to move content to another cache (for example, if the individual cache is full or reaches a predetermined level).

Individual caches 212, 222a, 222b, 232a, 232b, 232c, and 232d are cache memories which include cache, computing, and cache forwarding functions. Individual caches 212, 222a, 222b, 232a, 232b, 232c, and 232d are operatively configured to store, delete or copy data content objects in accordance with commands received from the CCFM 140. Individual caches 212, 222a, 222b, 232a, 232b, 232c, and 232d can also perform content processing functions (e.g. coding and transcoding) and report maintenance information to the CCFM 140, such as the available capacity left in each cache.

Figure 4:
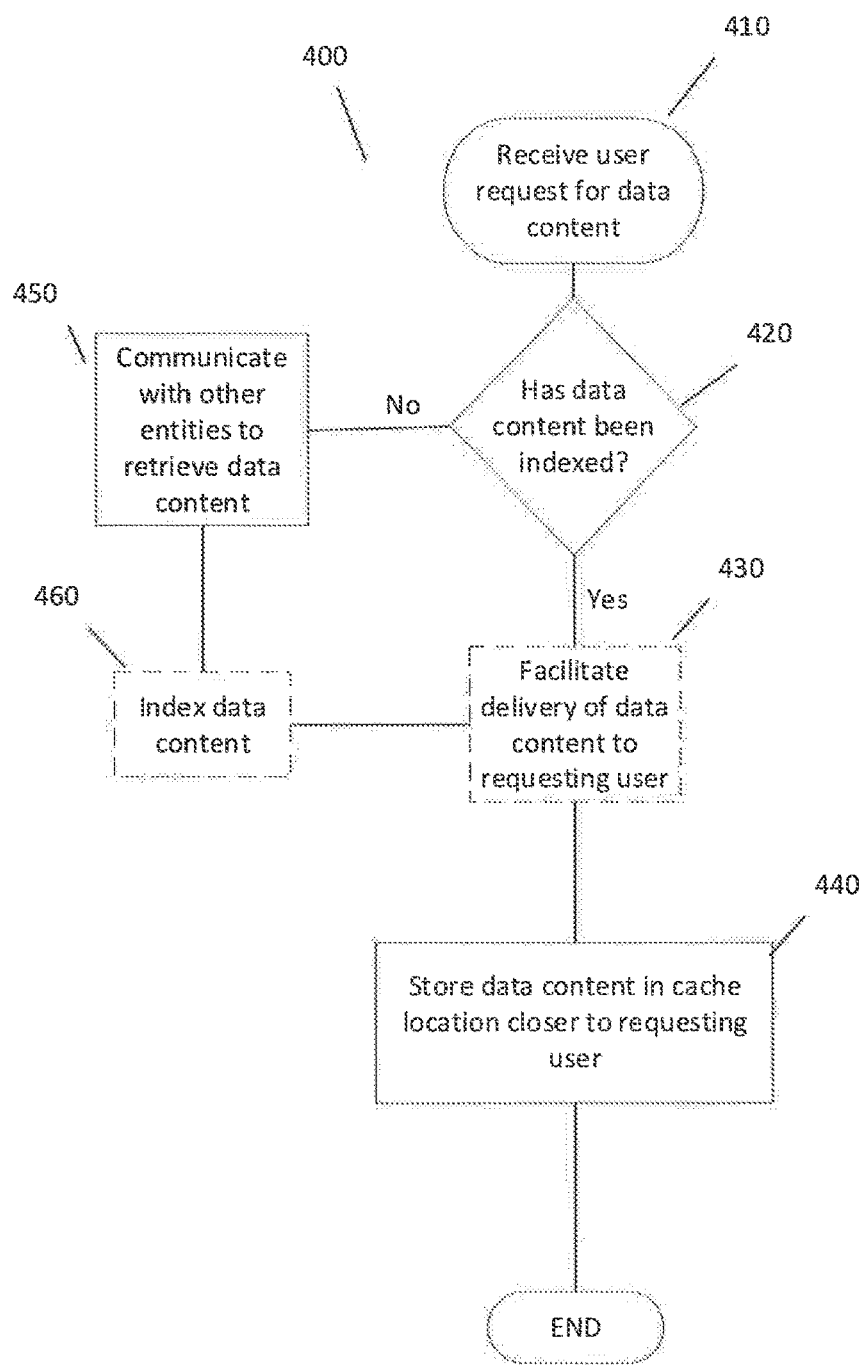
FIG. 4 is a flow chart illustrating a method for storing requested data content, according to an embodiment of the present invention.

FIG. 4 is a flow chart illustrating a method 400 for storing requested data content, according to an embodiment of the present invention. At step 410, a UE request for data content is received by CCFM 140. At step 420, the CCFM 140 checks indices to determine whether the requested data content has been indexed. For example, the CCFM 140 may check its content catalogue 148, FC register 142, MPC register 144, or LPC register 146 to determine whether the requested data content has been indexed within one or more of individual cache 212, 222a, 222b, 232a, 232b, 232c, and 232d within the communications system 100. If at step 420, the CCFM 140 locates the requested data content within an index, CCFM 140 may optionally at step 430 facilitate delivery of the requested data content from a cache holding the data content to the UE this may be performed directly by CCFM 140 or through another entity. The CCFM 140 then at step 440 stores a copy of the requested data content in a cache location relatively closer to the requesting UE. As an example, if a UE communicatively coupled to access node 130a makes a request for data content, CCFM 140 upon confirming the data content has been indexed, may then proceed to store the data content at individual cache 232a (at access node 130a), or along the data path to the UE at individual cache 212 (at third cache level 210) or individual cache 222a (at second cache level 220). In this way, the requested data content is stored in a location closer to the UE than the content provider 150 to facilitate subsequent delivery and/or retrieval of the data content to the same or another UE. In some embodiments, step 440 is omitted. For example for less popular content, the current location of the requested data may be sufficient, and there may be no need to move the data to a cache closer to the requesting UE.

If the CCFM 140 determines at step 420 that the requested data content has not been indexed, then it may be considered "new" non-indexed content and at step 450, the CCFM 140 communicates with the appropriate entity to retrieve the requested data content. For example, CCFM 140 may communicate with content provider 150, or other CCFM modules or caches (not shown) to obtain the requested data content. CCFM 140 may then optionally at step 460 perform indexing of the new data content, for example, as will be described in method 500 of FIG. 5 below. The method 400 may then proceed to optional step 430 to facilitate delivery of the requested data content to the requesting UE, and step 440 of storing the data content at a cache location relatively closer to the requesting UE.

Figure 5:
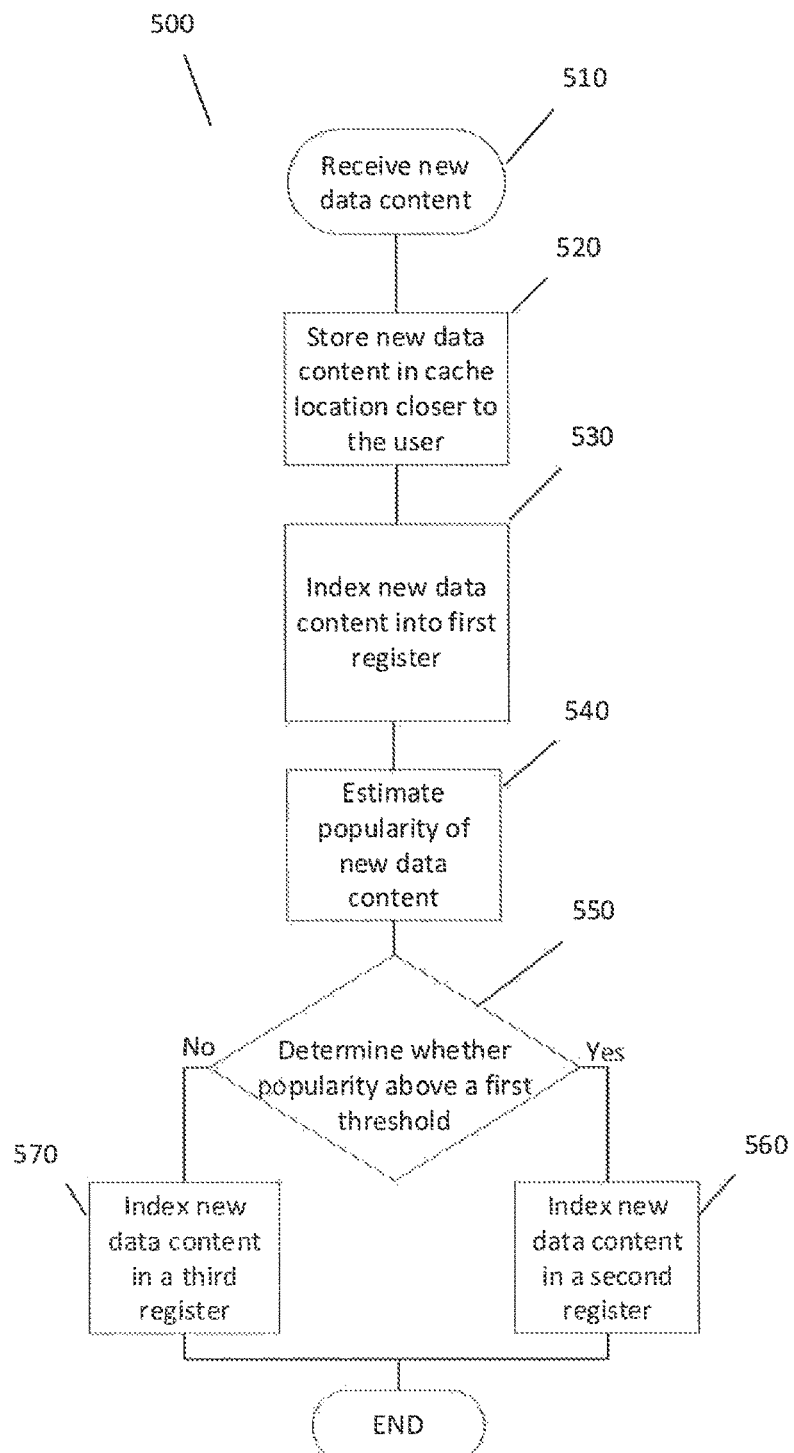
FIG. 5 is a flow chart illustrating a method for indexing data content, according to an embodiment of the present invention.

FIG. 5 is a flow chart illustrating a method 500 for indexing data content, according to an embodiment of the present invention. For example, method 500 may be applied for indexing new data content not currently indexed within CCFM 140 or stored in cache locations of communications network 100. At step 510, new data content is received, for example by CCFM 140 from content provider 150 in response to a request for the new data content by a UE. At step 520, the CCFM 140 stores a copy of the new data content in a cache location relatively closer to the requesting UE. At step 530, CCFM 140 indexes the new data content within a first register. For example, CCFM 140 may provide an entry in FC register 142 referring to the location of the new data content in the cache location in which it is stored. At step 540, the CCFM 140 then estimates the popularity of the new data content. For example, this may be based on the number of requests (hits) that were made for the new data content over a predetermined period, or by predicting the number of requests for the new data content over a predetermined future time period. At step 550, the CCFM 140 compares the popularity of the new data content to a first threshold. If the popularity is greater than the first threshold, then at step 560, the CCFM 140 further indexes the new data content in a second register, such as MPC register 144 for indexing data content having a relatively greater popularity. However, if the popularity is equal or lower than the first threshold, then at step 570, the CCFM 140 instead further indexes the new data content in a third register, such as LPC register 146 for indexing data content having a relatively lower popularity. In this way, new data content can be categorized into appropriate registers according to its relative popularity, such that it may later be referenced through the appropriate register for updating individual caches, as will be described in further detail below. In some embodiments, data content is indexed in only one type of register at a time, and upon indexing the data content in a new type of register, entries referring to the data content are removed (i.e. "de-indexed") from other types of registers. Types of registers may include FC registers, MPC registers, and LPC registers, for example.

Figure 6:
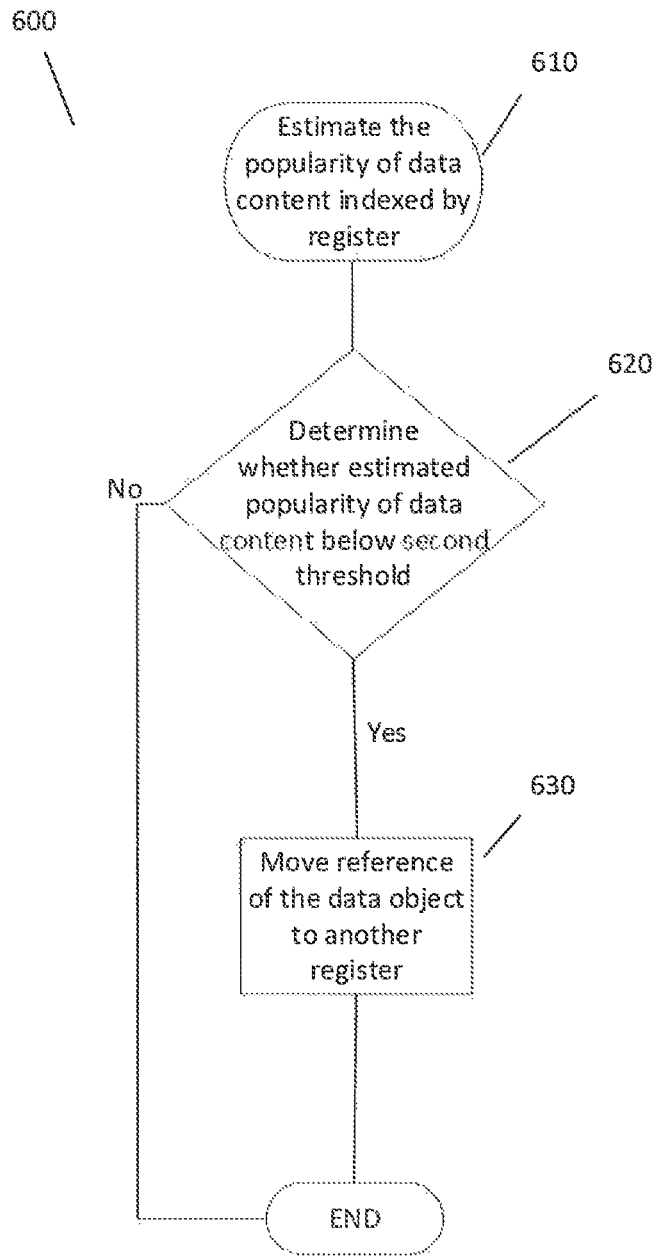
FIG. 6 is a flow chart illustrating a method for updating a register that indexes data content, according to an embodiment of the present invention.

FIG. 6 is a flow chart illustrating a method 600 for updating a register that indexes data content, according to an embodiment of the present invention. For example, method 600 may be applied by CCFM 140 for updating MPC register 144 which indexes relatively more popular data content. At step 610, the CCFM 140 estimates the popularity of data content indexed by the register. The CCFM 140 may do this for one or more items of data content associated with entries (e.g. references) in the register, and perform this either periodically or on-demand, according to certain embodiments. At step 620, the CCFM 140 determines whether the estimated popularity of the data content is below a second threshold. If the popularity of the data content is below the second threshold, then at step 630, the CCFM 140 moves the entry for the data content from the register to another register. For example, CCFM 140 may move an entry for a particular data content in MPC register 144, to LPC register 146 if the popularity of the data content is below the second threshold. If however at step 620, the popularity of the data content is above the second threshold, then the method 600 ends. In this way, references to data content within various registers can be updated by moving them to different registers according to the current popularity of their associated data content. Accordingly, one register (e.g. MPC register 144) may contain updated references to relatively more popular data content, while another register (e.g. LPC register 146) may contain updated references to relatively less popular data content. Register updating may be performed periodically or upon being triggered due to satisfaction of a predetermined set of criteria.

Figure 7:
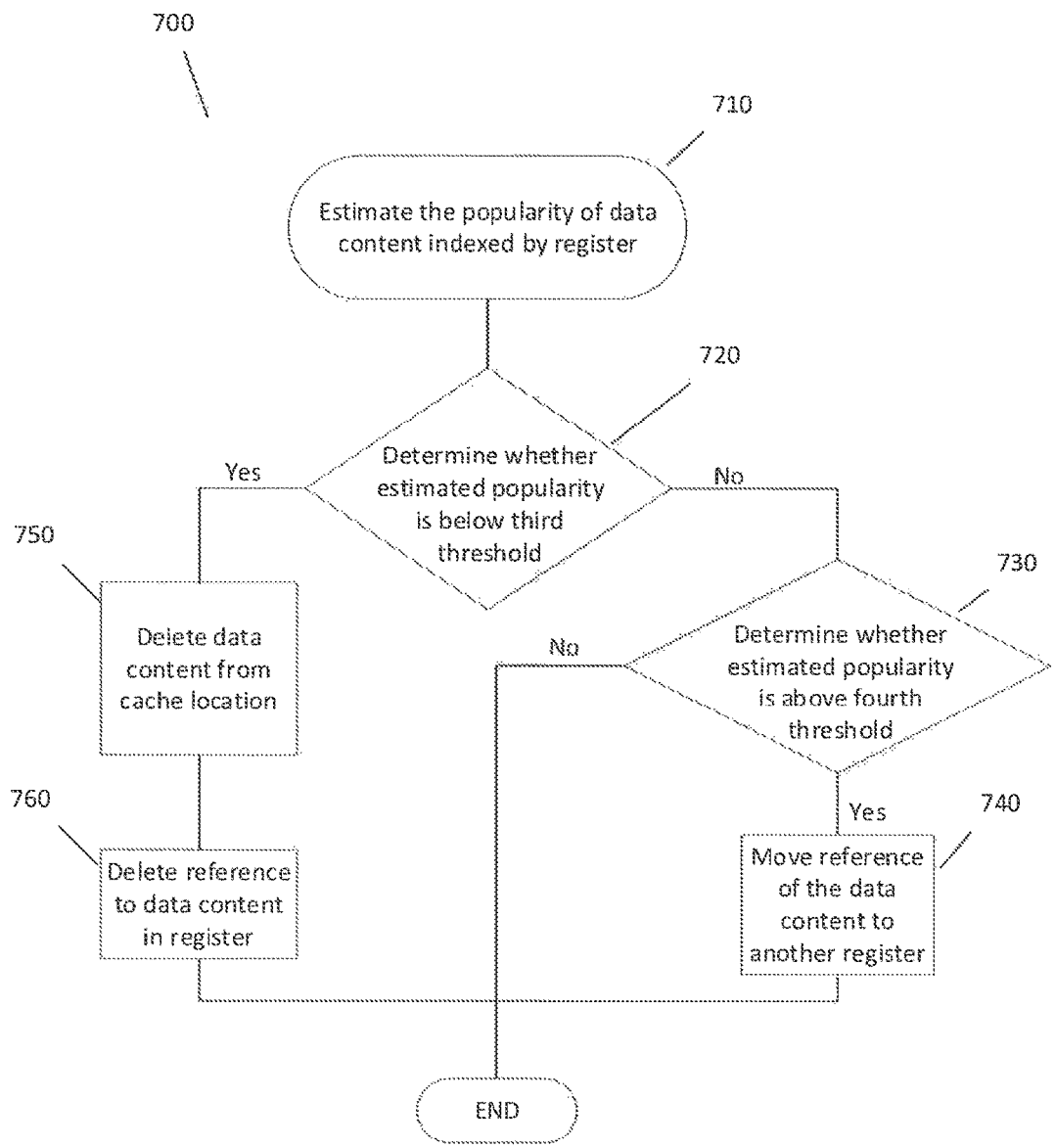
FIG. 7 is a flow chart illustrating a method for updating a register that indexes data content, according to an embodiment of the present invention.

FIG. 7 is a flow chart illustrating a method 700 for updating a register that indexes data content, according to an embodiment of the present invention. For example, method 700 may be applied by CCFM 140 for updating references in LPC register 146 which indexes relatively less popular data content, and/or for purging storage of less popular data content in associated cache locations. At step 710, the CCFM 140 estimates the popularity of data content indexed by a register, such as the LPC register 146 for example. At step 720, CCFM 140 determines whether the estimated popularity of the data is below a third threshold. If the popularity is below the third threshold, then at step 750, the CCFM 140 deletes the data content from the cache location where it is stored, and at step 760 deletes the reference to the data content in the register. If however at step 720, the CCFM 140 determines that the estimated popularity is above the third threshold, then at step 730 the CCFM 140 further determines if the estimated popularity is above a fourth threshold. If at step 730 the CCFM 140 determines the estimated popularity is below the fourth threshold, the method ends. If however at step 730 the CCFM 140 determines the estimated popularity is above the fourth threshold, then at step 740, the CCFM 140 moves reference of the data content to another register, such as MPC register 144 for example. When applied to LPC register 146 for example, references within the LPC register 146 that lose popularity below the third threshold can be purged, references within the LPC register 146 that gain popularity above the fourth threshold can be moved to the MPC register 144 which references more popular data content, and other references may remain in the LPC register 146. Accordingly, registers can be updated to contain entries which reference data content that currently meet a desired popularity or other characteristic. Also, the data content itself may also be optionally deleted or moved based on its changing popularity or other characteristic. Deletion of data content may be performed immediately or at a later time when space is needed in a particular cache. Register updating may be performed periodically or upon being triggered due to satisfaction of a predetermined set of criteria. For example updating of the LPC register 146 may be performed when space is needed in a cache containing data content with an associated reference in LPC register 146.

In certain embodiments, it is noted that the above-described thresholds (such as the first, second, third and fourth thresholds, etc.) can be adjusted dynamically. For example the threshold values can be changed based on available memory capacity of the cache under consideration. The first, second, third and fourth thresholds, as referred to herein, can be pre-set, provided by a network management entity, adjusted dynamically by the CCFM, or the like. The fourth threshold is greater than the third threshold. The second threshold may be greater than the fourth threshold to inhibit excessive cycling of content between the MPC and LPC registers. The first threshold may be set between the second and fourth thresholds, however other configurations are possible.

Figure 8:
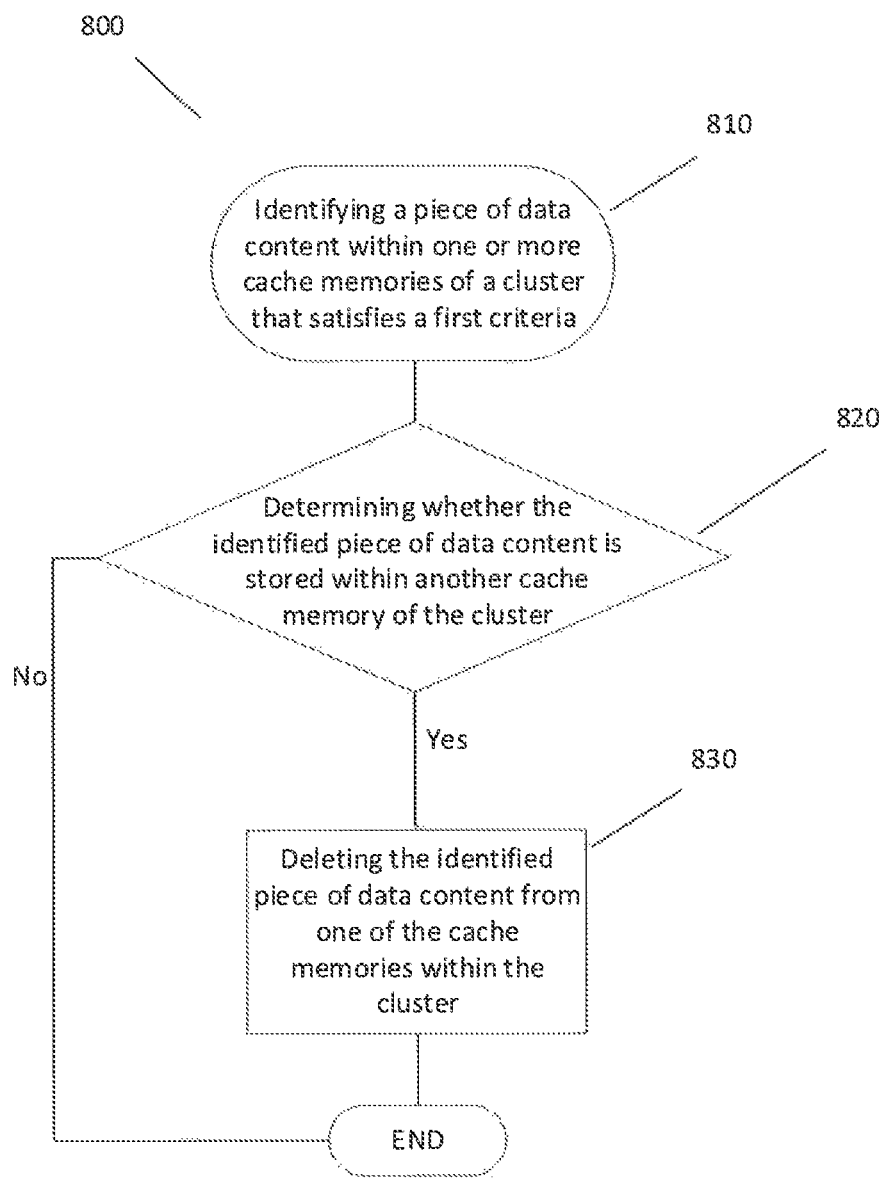
FIG. 8 is a flow chart illustrating a method for updating data content within a cluster or composite cache comprising one or more cache memories, according to an embodiment of the present invention.

FIG. 8 is a flow chart illustrating a method 800 for updating data content within a cluster or composite cache comprising one or more cache memories, according to an embodiment of the present invention. For example, method 800 may be applied by CCFM 140 for updating a cluster (e.g. geographical area) comprising one or more of individual caches 212, 222a, 222b, 232a, 232b, 232c, and 232d. At step 810, the CCFM 140 identifies a data content item within one or more cache memories of the cluster that satisfies a first criterion. For example, the first criterion may comprise the least recently used data content, the least popular data content, or a data content item below a certain popularity threshold. In some cases, the least recently used criterion may serve as an indication of the relative non-popularity of data content item within a cluster. However, other criterion may be used in other embodiments. At step 820, the CCFM 140 determines whether the identified data content item in 810 is stored within another cache memory of the cluster. If yes, then at step 830, the CCFM 140 proceeds to delete the identified data content from one of the cache memories of the cluster. If however the CCFM 140 determines at step 820 that the identified item of data content is only stored on one cache memory within the cluster, it will remain and the method will end. In this way, method 800 can be used to maintain a cluster of cache memories by removing redundant data content items one at a time, which satisfy a given criteria. Gradual removal of redundant data content may improve cache hit performance while ensuring that the data content remains in the cluster.

In an alternative embodiment of method 800 (not shown), if CCFM 140 determines at step 820 the identified item of data content is only stored at one cache memory within the cluster, but the item of data content is the least popular within the cluster, or at least has a popularity level, for the cluster, which is below a predetermined threshold, the identified item of data content can be deleted from the cache and hence also from the cache cluster. The threshold may be an absolute or relative threshold. For example, an absolute threshold may correspond to an absolute popularity level, below which items of data content are candidates for deletion. A relative threshold may correspond to an integer value N, such that the N least popular items of data content are candidates for deletion.

Figure 9:
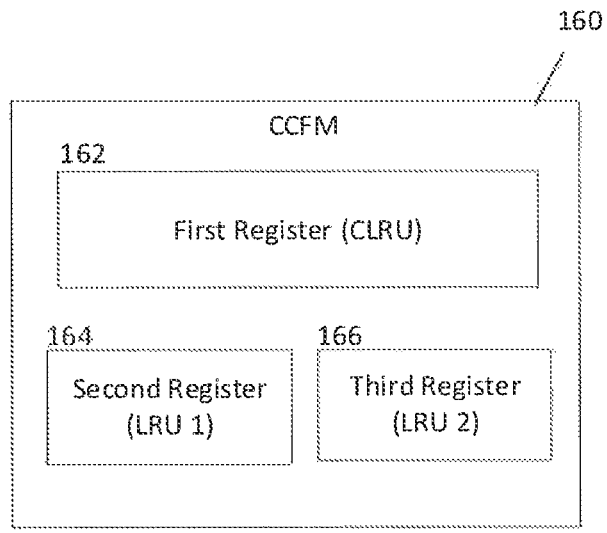
FIG. 9 is a schematic diagram of another controller according to another embodiment of the present invention.

FIG. 9 is a schematic diagram of another CCFM 160 according to another embodiment of the present invention. CCFM 160 may be similar to CCFM 140 shown in FIG. 3. The CCFM 160 includes a first register 162 which may be a cluster least recently used (CLRU) table 162 for indexing entire clusters (or composite caches) according to when they were last used, a second register 164 which may be a first least recently used (LRU) table associated with a first component cache of the cluster, and a third register 166 which may be a second LRU table associated with a second component cache of the cluster. Each register 162, 164, 166 stores information related to corresponding data content items, such as their identification number. In one embodiment, the first register 162 lists cached data content items which have been accessed relatively less recently than other data content items. For example, if a cache holds N data content items, then M<N most recently accessed content items can be stored in a Most Recently Used (MRU) table, and the remaining N−M content items can be stored in the first register 162. As another example, the remaining N−M content items can be further subdivided so that the more recently used of these remaining content items are excluded from the first register 162.

Figure 10:
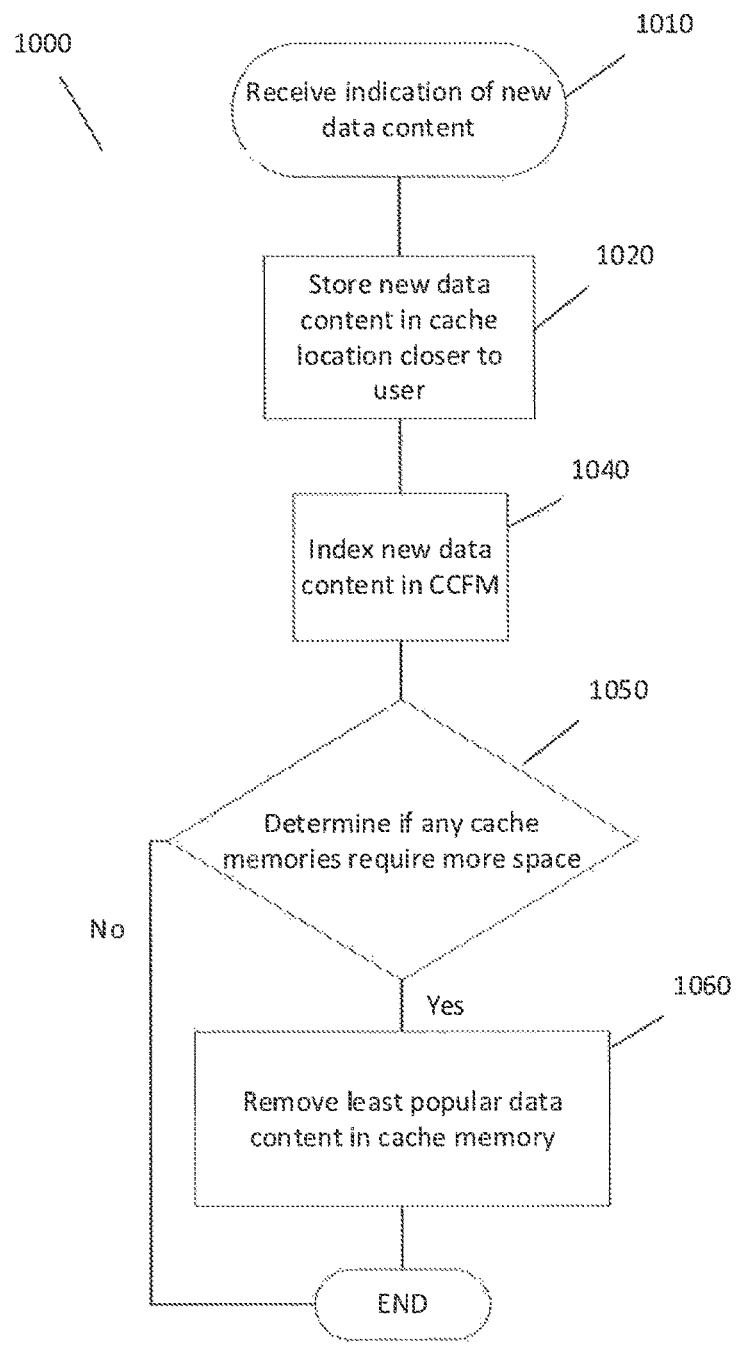
FIG. 10 is a flow chart illustrating a method for storing new data content into cache memory of a communications system, according to an embodiment of the present invention.

FIG. 10 is a flow chart illustrating a method 1000 for storing new data content into cache memory of a communications system, according to an embodiment of the present invention. Method 1000 may be implemented by CCFM 160 in conjunction with communications network 100, for example. At step 1010, CCFM 160 receives an indication of new data content. In some embodiments, the indication may consist of new data content itself, and may be received by CCFM 160 in response to a request from a UE. In some embodiments, the new data content may be indexed in LPC register 146 as relatively less popular content, for example. At step 1020, CCFM 160 stores the new data content in a cache location relatively closer to the requesting UE, as compared to the original source of the new data content. At step 1040, the new data content is indexed in the CCFM 160. For example, the ID of the new data content may be indexed in a Fresh Content (FC) register of the composite cache, as well as a FC register of one of the component caches at which the new data content is stored. At step 1050, the CCFM 160 determines if any cache memories require additional space. For example, CCFM may canvass individual component caches of the composite cache and make a determination whether they require more space based on whether they are full, approaching capacity, or meet a predetermined capacity threshold. If the CCFM 160 determines that a cache memory requires more space, then at step 1060, the CCFM 160 removes the least popular data content (for example as measured by the LRU criterion) in the composite cache memory. The least popular data content can be determined by consulting the first register 162 consisting of an LRU table, for example. If however the CCFM 160 determines at step 1050 that the cache memories do not require additional space, the method 1000 ends.

Figure 11:
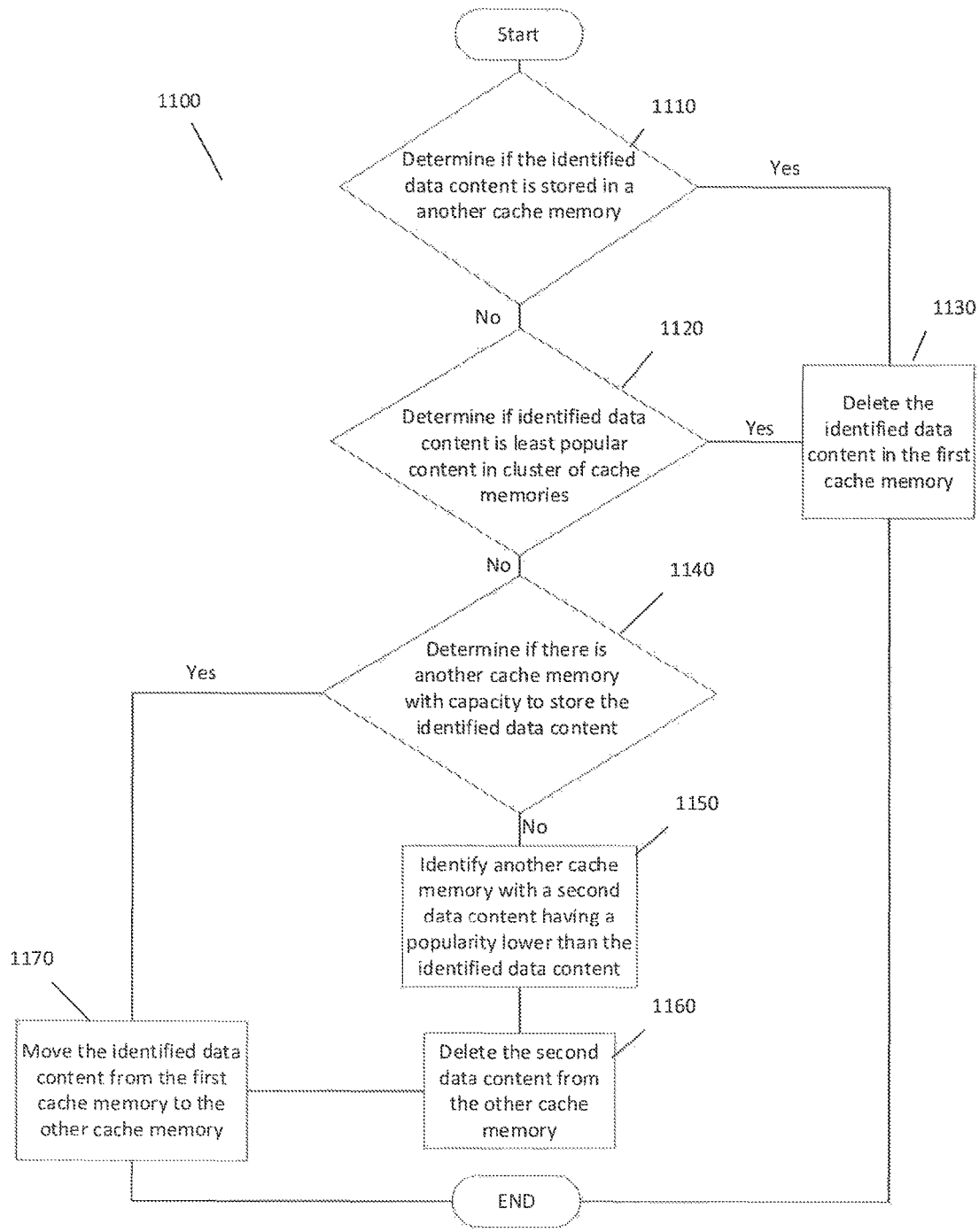
FIG. 11 is a flow chart illustrating a method for removing identified data content from a first cache memory, according to an embodiment of the present invention.

FIG. 11 is a flow chart illustrating a method 1100 for removing identified data content from a first cache memory, according to an embodiment of the present invention. For example, the first cache memory may require additional capacity to store new data content, and the identified data content may correspond to the least popular data content in the cache memory, the least popular data content within a cluster of cache memories, or data content having a popularity below a predetermined threshold. At step 1110, CCFM 160 determines whether the identified data content is stored in multiple caches of the same cluster. If yes, then CCFM 160 proceeds to step 1130 and deletes the identified data content in the first cache memory and the method ends. If CCFM 160 determines no at step 1110, the CCFM 160 proceeds to step 1120 and further determines if the identified data content is the least popular data content within the cluster of cache memories. If yes, then CCFM 160 proceeds to step 1130 and deletes the identified data content in the first cache memory and the method ends. If CCFM 160 determines no at step 1120, the CCFM 160 proceeds to step 1140 and further determines if there is another cache memory with capacity to store the identified data content. If yes, then CCFM 160 proceeds to step 1170 and moves the identified data content from the first cache memory to the other cache memory with capacity, and the method ends. If CCFM 160 determines no at step 1140, the CCFM 160 proceeds to step 1150 and identifies another cache memory with a second data content having a popularity lower than the identified data content. The CCFM 160 then at step 1160 deletes the second data content from the other cache memory, and proceeds to step 1170 to move the identified data content to the other cache memory. Alternatively for step 1160, after deleting the second data content, various data content items can be rearranged within the multiple cache memories, the rearrangement including moving data content to the other cache memory and moving the identified data content from the first cache memory and leaving space in the first cache memory. In this way, capacity within a cache memory can be more efficiently made available, and identified data content is either moved or deleted according to its popularity relative to other data content.

In some embodiments, in addition to managing and/or moving cached data content based on popularity and available memory considerations, data content may be managed based on other factors, such as server loads, network congestion, data processing requirements, and available computing power, or the like, or a combination thereof.

The following examples illustrate application of the above method 1100 using CCFM 140, 160 based on 4 different exemplary scenarios. These examples suppose that an identified data content (X) is to be removed from a first component cache of a composite cache, for example, based on its position as referenced in the second register 164 comprising an LRU table.

In a first example scenario, the identified data content is also located in a second component cache. In this case, CCFM 160 will at step 1110 determine that the identified data content (X) is also located in another cache memory (second component cache). Accordingly, CCFM 160 will at step 1130 delete the identified data content (X) from the first component cache memory. Since the identified data content (X) is still present in the network (in the second component cache), it can still be retrieved from that location at a later time if needed. This will free up capacity in the first component cache while still preserving storage of the identified data content (X) in the second component cache.

In a second example scenario, the identified data content is also the least popular data content in the composite cache. In this case, CCFM 160 may at step 1120 determine that the identified data content (X) is the least popular data content of both the first component cache and the composite cache, as indicated in both the cluster LRU table 162 and the first LRU table 164. Accordingly, CCFM 160 will at step 1130 delete the identified data content (X) from the first component cache. Since the identified data content (X) is also the least popular data content, it is less likely to be targeted for retrieval at a later time and its removal is less likely to have an impact on network performance.

In a third example scenario, another component cache has capacity to accommodate the identified data content. In this case, CCFM 160 may at step 1140 determine that another component cache memory (i.e. second component cache) has capacity to accommodate the identified data content (X). Accordingly, at step 1170, the identified data content is moved from the first component cache to the second component cache. In this way, space within the first component cache can be freed up, while the identified data content (X) remains preserved in second component cache. In some embodiments, moving of the identified data content is performed only when the data content is not the least popular content of the composite cache.

In a fourth example scenario, no other component cache has capacity to accommodate the identified data content. In this case, CCFM 160 may at step 1140 determine that no other cache memories currently have capacity to accommodate the identified data content (X). Accordingly, CCFM 160 at step 1150 identifies another component cache of the cluster containing a second data content (X+1) that has a popularity lower than the identified data content (X). Since the second data content (X+1) is less popular than the identified data content (X), it is less likely to be targeted for retrieval at a later time and its removal is less likely to have an impact on network performance. In some embodiments, the second data content (X+1) is the least popular data content of the cluster, for example as identified in cluster LRU table 162. CCFM 160 at step 1160 then accordingly deletes the second data content (X+1) from the other component cache, and proceeds to step 1170 to move the identified data content (X) from the first component cache memory to the other component cache memory. This allows for space within the first component cache to be freed up, while preserving the relatively more popular data content (identified data content (X)) in the second component cache over less popular data content (second data content (X+1)).

Figure 12:
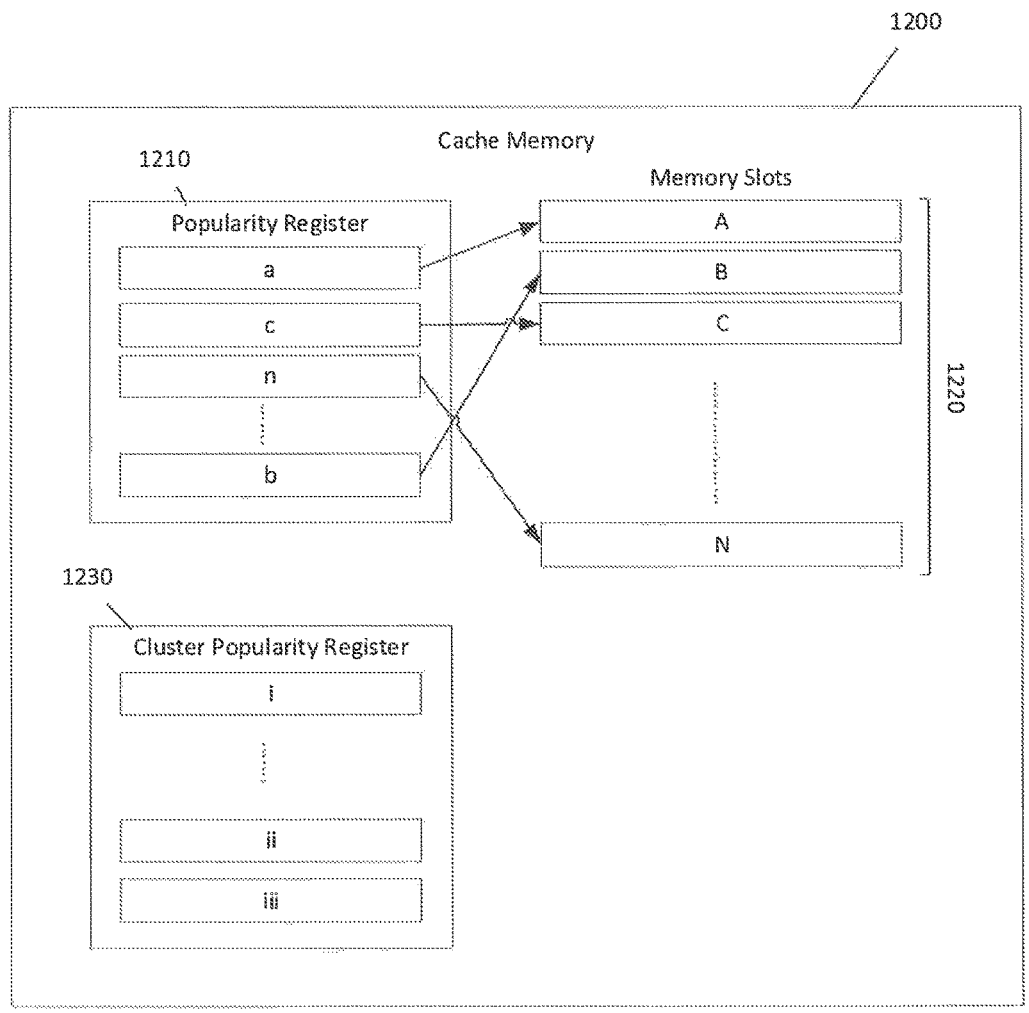
FIG. 12 is schematic diagram of a cache memory, according to an embodiment of the present invention.

FIG. 12 is schematic diagram of a cache memory 1200, according to an embodiment of the present invention. For example, individual caches 212, 222a, 222b, 232a, 232b, 232c, and 232d of FIG. 2 may be comprised of cache memory 1200 in certain embodiments. As shown in FIG. 12, cache memory 1200 includes a popularity register 1210, and memory slots 1220 for storing up to N data content items. The popularity register 1210 is an index containing references (a . . . n), each of which track the location of a corresponding data content item (A . . . N) within the memory slots 1220. Further, the order of the references (a . . . n) in the popularity register 1210 provide an indication of the relative popularity of corresponding data content items (A . . . N). In certain embodiments, the references (a . . . n) may further include information regarding the corresponding data content item, such as its ID number, a record of its access times, and statistical information such as meta data for the data content item.

For example, in an embodiment where popularity of a data content item increases as distance between its corresponding reference in the popularity table 1210 and the top of the table decreases, the top reference in the popularity table 1210 would "point" to the most popular data content item in memory slots 1220. Using the example in FIG. 12 to further illustrate, reference a points to data content A as being the most popular, reference c points to data content C as the next most popular, and reference b points to data content B as the least popular. In this way, popularity table 1210 can index the relative popularity of data content items (A . . . N) without requiring data content items to be continually moved or shifted in memory slots 1220 upon a change in popularity. In certain embodiments, popularity may be determined by a popularity estimator module, or according to the data content item that was last recently used (LRU). For example, when popularity table 1210 comprises an LRU table, and a new data content item is stored anywhere in memory slots 1220, the reference to the new data content item may be placed at the top of the LRU table to indicate that the new data content item is the last recently used item. Furthermore, if a data content item is accessed from memory slots 1220, its corresponding reference may also be moved to the top of the LRU table to indicate it was most recently accessed.

In certain embodiments, cache memory 1200 may further include a cluster popularity register 1230 containing references (i . . . iii) to various memory clusters, and similarly sorting them by relative popularity. Cluster popularity register 1230 may be used to sort the relative popularity of cluster memories hierarchically. In certain embodiments, cluster popularity may be determined by a popularity estimator module, or according to the cluster that was last recently used (LRU).

In certain embodiments, popularity table 1210 of cache memory 1200 may be replaced by a cost table including references which ranks corresponding data content items according to a cost metric. In one embodiment, cost metric may be defined as the cost to access a particular data content item if it is outside of the cache memory 1200. Some embodiments may alternatively comprise a Cost and Popularity table, which formulaically ranks corresponding data content items in storage slots 1220 based on at least both of these factors. In some embodiments, whenever a particular data content item is accessed, its corresponding cost metric is reduced by the amount of single content access cost, and the cost table may be updated to reflect this. In some embodiments comprising both a popularity table and a cost table, the cost table will be updated whenever popularity of data content items are estimated.

Figure 13:
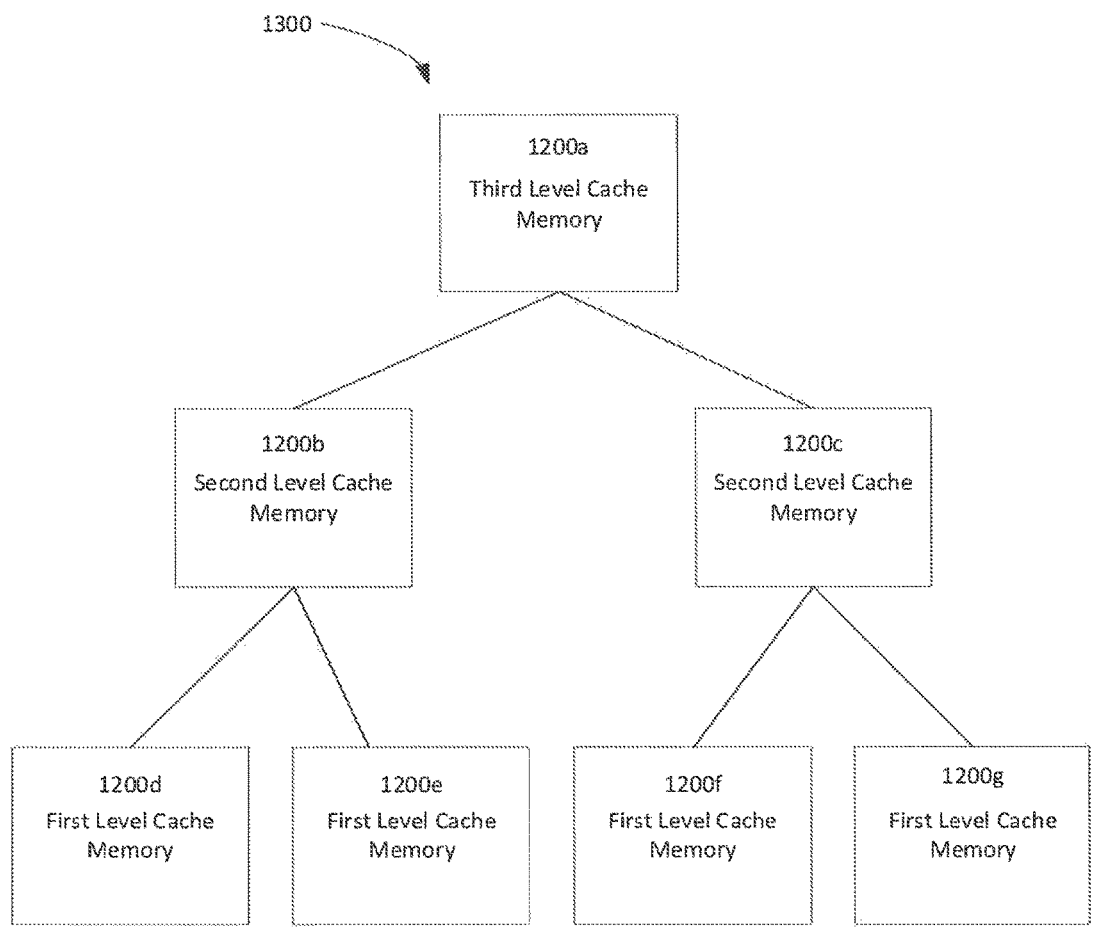
FIG. 13 is a block diagram of a hierarchical cache system according to an embodiment of the present invention.

FIG. 13 is a block diagram of a hierarchical cache system 1300 according to an embodiment of the present invention. As shown, hierarchical cache system 1300 includes a third (i.e. highest) level cache memory 1200a, second level cache memories 1200b, 1200c, and first (i.e. lowest) level cache memories 1200d, 1200e, 1200f, 1200g, all of which may be considered aspects of cache memory 1200 of FIG. 12. While FIG. 13 illustrates a hierarchical cache system 1300 having a symmetrical tree-like structure, in other embodiments, hierarchical cache system 1300 may consists of a different structure, such as a vertical structure, or non-symmetric structure.

Figure 14:
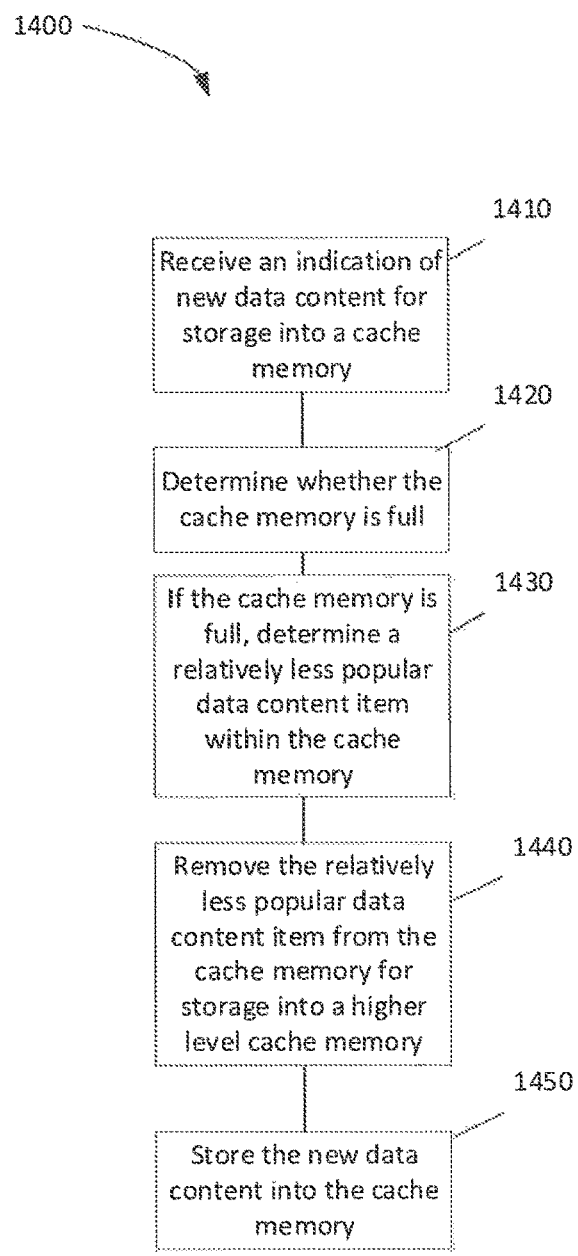
FIG. 14 is a flow chart illustrating a method for storing a new data content item into a cache memory of a hierarchical cache system, according to an embodiment of the present invention.

FIG. 14 is a flow chart illustrating a method 1400 for storing a new data content item into a cache memory of a hierarchical cache system, according to an embodiment of the present invention. For example, method 1400 may be applied with CCFM 140, 160 on hierarchical cache system 1300 of FIG. 13. At step 1410, CCFM 140 receives an indication of new data content for storage into a cache memory. At step 1420, CCFM 140 determines whether the cache memory is full, and if the cache memory is full, CCFM 140 determines, at step 1430, a relatively less popular data content item within the cache memory. In some embodiments, the relatively less popular data content item is the least popular data content item, as determined from a popularity estimator, or the position of its corresponding reference in a popularity table, for example. At step 1440, CCFM 140 removes the relatively less popular data content item from the cache memory for storage into a higher level cache memory. For example, when the cache memory consists of the first (i.e. lowest) level cache memory 1200d in FIG. 13, the higher level cache memory may consist of the second level cache memory 1200b, or third level cache memory 1200a. Finally, at step 1450, CCFM 140 stores the new data content into the cache memory.

In certain embodiments, step 1440 further comprises comparing the relatively less popular data content item from the cache memory to data content items in the higher level cache memory, and if the relatively less popular data content item is already stored in the higher level cache memory, deleting the relatively less popular data content item from the cache memory.

In certain embodiments, method 1400 further comprises storing the relatively less popular data content item into the higher level cache memory, and placing a reference to the relatively less popular data content item into a popularity table of the higher level cache memory according to its popularity. Popularity, for example, may be determined by the last access time (e.g. LRU) of the relatively less popular data content.

In certain embodiments, method 1400 further comprises removing a relatively less popular data content item in the higher level cache memory to accommodate storage of the relatively less popular data content item from the cache memory. For example, this may occur when the higher level cache memory is the third level cache memory 1200a in FIG. 13 and has no more room in its storage slots. Accordingly, a relatively less popular data content item in third level cache memory 1200a may be removed, for example, according to its popularity table.

As such, embodiments of the present invention comprise placing relatively lower-popularity content at cache locations that are further from a set of UEs (or content destinations), and placing relatively higher-popularity content at cache locations that are closer to UEs. Further, embodiments of the present invention comprise placing relatively lower-popularity content at cache locations which are situated on a data path between a larger number of UEs and a content provider, and placing relatively higher-popularity content at cache locations which are situated on a data path between a smaller number of UEs and the content provider.

Figure 15:
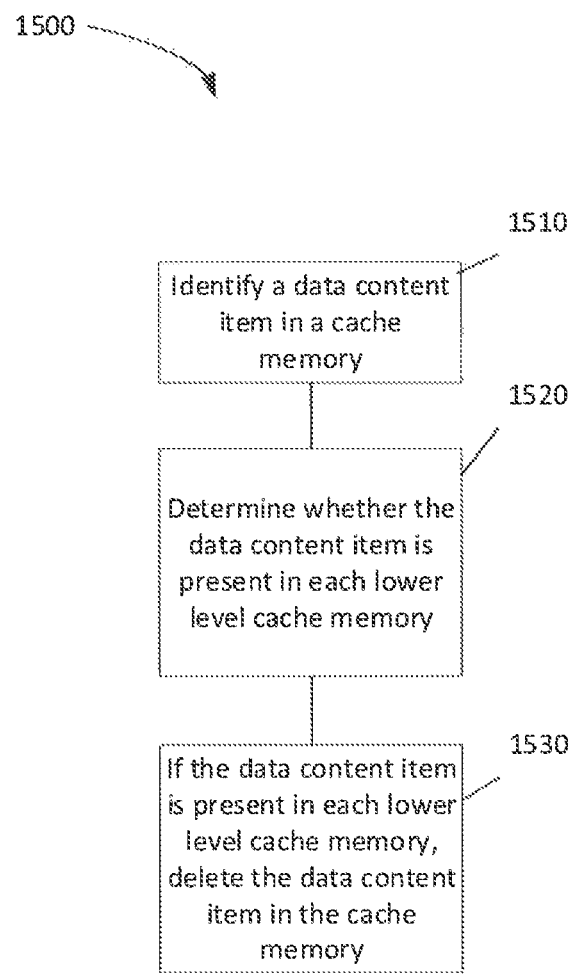
FIG. 15 illustrates a method for managing data content items in a hierarchical cache system, according to an embodiment of the present invention.

FIG. 15 is a method 1500 for managing data content items in a hierarchical cache system, according to an embodiment of the present invention. For example, method 1500 may be applied with CCFM 140, 160 on hierarchical cache system 1300. At step 1510, CCFM 140 identifies a data content item in a cache memory. At step 1520, CCFM 140 determines whether the data content item is present in each lower level cache memory. And if the data content item is present in each lower level cache memory, CCFM 140 at step 1530 deletes the data content item in the higher-level cache memory. In this way, redundant copies of data content items that are further away from UEs will be deleted, while preserving copies of the data content item in cache locations closer to UEs. For example, if data content item (X) is located in each of cache memories 1200b, 1200d, and 1200e of FIG. 13, data content item (X) may be deleted from cache memory 1200b.

Referring back to the hierarchical cache system 1300 of FIG. 13, a parent cache may be defined as a cache memory having cache memories communicatively coupled thereto and closer to UEs. A Child cache may be defined as a cache memory having cache memories communicatively coupled thereto and further from UEs. For example, cache memory 1200a is the "parent" to cache memories 1200b, 1200c, and cache memories 1200d, 1200e are the "children" to "parent" cache memory 1200b. In some embodiments, a cache cluster may be defined as child cache memories sharing the same parent cache, for example as illustrated by clusters 240, 250, and 260 in FIG. 2. In some embodiments, caches of a hierarchical cache can be provided based on geography, with child caches serving smaller geographic regions than their parents. For example, caches serving a city may be child caches of another level of caches serving a province, state or region, and these caches may in turn be child caches of another level of caches serving a country.

The following describes another method for managing data content items in a hierarchical cache system (not shown). When new data content is received (for example, from a UE request), it is stored in a cache memory closest to the requesting UE, and a corresponding reference is written to the top of an LRU table of the cache memory. When references for new data content are added to the top of a table, other references are propagated downward in the table, and references at the bottom of the table are discarded from that table. When data indicative of new content is inserted to a LRU table of a level n (n<=N) cache, and the memory for that cache is full, one or more data items identified by entries at the bottom of the LRU table of this cache are moved to a parent cache, and indexed in an LRU table thereof according to the last access time of the content (more generally, the popularity of the content). If the moved object is already in the LRU table of the parent cache, the duplicated object in the cache at level n is removed. Content at the bottom of the LRU table of the highest level cache is removed when another object is moved from a child of the highest level cache to the highest level cache, and there is no more memory. If a content in a level n (n<N) cache is accessed, this content is moved to the top of LRU table of this cache. The cache ID of the child cache and access time are included in statistical records (meta information) of the content object at the top of the LRU table. If a content stored in a level n (n<N) cache is accessed, and the access is from one of child caches that reported a miss, this content will be copied to the higher level cache at the top of LRU table. If all child caches have copies of the same content, the parent cache can remove this content from its cache. Alternatively, the parent cache may delete content if at least a predetermined number of child caches include this content. The above-described approach can be applied to other cache writing/deleting methods, for example based on other measures of content popularity.

Figure 16:
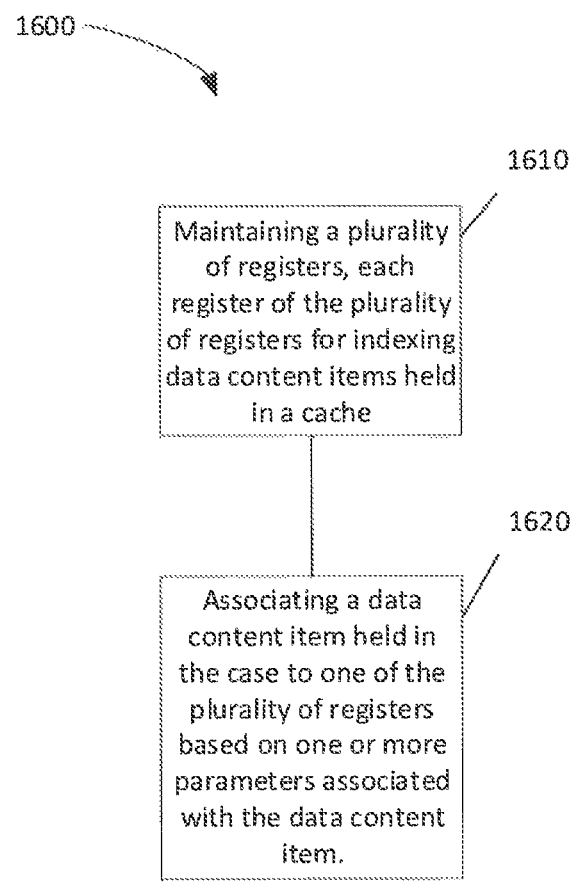
FIG. 16 illustrates a method for managing data content items in a cache of a communication network, according to an embodiment of the present invention.

For further clarity, FIG. 16 illustrates a method for managing data content items in a cache of a communication network, in accordance with an embodiment of the present invention. The method comprises maintaining 1610 a plurality of registers, each register of the plurality of registers for indexing data content items stored in the cache. The method further comprises associating 1620 a data content item stored in the cache to one of the plurality of registers based on one or more parameters associated with the data content item.

Embodiments of the present invention are directed towards systems and methods for managing cache memories within a communications network. The communications network includes a CCFM module communicatively coupled to one or more cache memories for updating and managing data content within the cache memories. The CCFM can make decisions as to store or delete particular items of data content within cache memories based on various criteria such as: the popularity of the data content (regionally or globally across the network), whether the data content is stored in another cache location, when the data content was last recently used, the available memory in cache locations, aggregate usage statistics of the data content.

Embodiments of the present invention provide for a hierarchical or clustered caching approach, in which individual component caches each rank their stored content items by popularity based on local access statistics, with less popular content items being candidates for removal from the cache. However, multiple component caches may be clustered together into a composite cache, for example based on geographic proximity. A composite cache is also referred to herein as a cluster. The stored content items of this composite cache substantially equal the union of the stored content items of the lower-level caches. The composite cache can modify and/or inhibit removal of content items from a component cache. Whereas cache levels refer to the locations of caches within a branching network structure as illustrated in FIG. 2, cache components and composite caches are nested entities which may reside on one or a plurality of cache levels.

In some embodiments, modifying and/or inhibiting removal of content items from a component cache by the composite cache proceeds as follows. The composite cache ranks its stored content items by popularity based on access statistics that are local to the higher level cache. It is noted that access statistics for the composite cache are generally geographically broader-based than access statistics for a component cache thereof. When a component cache initiates removal of a stored content item, for example in response to locally measured low popularity, the composite cache determines whether this removal is acceptable. For example, the composite cache may determine whether this content item is also stored in another component cache thereof, and, if not, the composite cache determines whether this content item has adequately low popularity that removal from the higher level cache is acceptable. If removal from the composite cache is acceptable, the component cache is allowed to proceed with removal of the stored content item. Otherwise, the composite cache can either inhibit deletion of the content item from the component cache, or initiate a transfer of the content item from the component cache to another memory location within the composite cache, for example corresponding to another component cache or a separate memory dedicated to the composite cache. Transferring a data content item from a component cache may include storing the data content item in the other memory location and deleting the data content item from the component cache. For the transfer, the data content item may be communicated from the component cache or retrieved by the other memory location from another location such as a content provider.

In various embodiments, the composite cache can be configured so that no fewer than a predetermined number of component caches hold copies of a given content item having at least a threshold popularity. In the above example embodiments, the predetermined number is set to one, meaning that adequately popular items of data content are required to be stored in at least one component cache. However, it is contemplated that the predetermined number may be set to a value N greater than one, meaning that adequately popular items of data content are required to be stored in at least N component caches of a composite cache. In this case, transfer of the content item from the component cache to another storage location can be initiated, or removal of the content item from the component cache, can be performed whenever at most N of the caches hold copies of the data content item. As such, the number of copies of the data content item in the composite cache will not drop further, and preferably not below N.

In various embodiments, each content item is associated with multiple popularity levels. A most local popularity level is associated with popularity of the content item as measured by the component cache which actually stores the content item. A more global popularity level is associated with popularity of the content item as measured by a composite cache which contains of this component cache. Popularity of a content item measured by a cache may be based on requests received by that cache. For a composite cache, this includes the requests received by the component caches thereof.

In some embodiments, transferring the content item from the component cache to another storage location includes identifying and removing another low-popularity content item of the composite cache in order to free up memory for storing content item to be transferred. The low-popularity content item of the composite cache may be a least popular content item, a content item having a popularity lower than that of the content item to be transferred, and/or a content item having popularity below threshold value. Popularity in this sense is determined from the perspective of the composite cache. For example, the content item to be transferred may be moved from the component cache to the storage location from which the low-popularity content item of the composite cache was removed. As another example, a sequence of content item moves may be performed, beginning with moving content to the storage location from which the low-popularity content item of the composite cache was removed and subsequently involving moving the content item from the component cache. The sequence of content item moves may be configured so that content items are moved, on average, from component caches where they are relatively less popular to component caches where they are more popular. It is noted that removal of a low-popularity content item from the composite cache may not be required if the composite cache is not full. However, in steady-state it is anticipated that caches will be full.

In some embodiments, multiple copies of a content item can be stored in a composite cache, for example at multiple differently located component caches. This situation may arise naturally for more popular content items as they are cached at different component caches.

In embodiments of the present invention, composite caches can include component caches at a single cache level, or at multiple cache levels. In embodiments of the present invention, composite caches can themselves be component caches of an even larger composite cache. This larger composite cache may behave similarly to or identically to one of its component composite caches. Two composite caches acting as component caches of a larger composite cache can be, but are not necessarily, disjoint. Because a composite cache inhibits removal of content unless that content is of adequately low popularity for the composite cache, content which is unpopular at one location tends to be moved toward locations where the content is still popular. As such, content tends to be moved rather than deleted when its popularity drops, until it is unpopular for the highest-tier composite cache present.

In various embodiments, a composite register which tracks popularity of data content items stored in a composite cache may include component registers which track popularity of data content items stored in component caches thereof. The component registers may be explicitly provided as separate entities, or implicitly contained within the composite register. For example, the composite register can include, for each data content item, an indication of popularity from the perspective of the composite cache (referred to as cluster-wide popularity), an indication of popularity from the perspective of a component cache where the content item is stored (referred to as local popularity), and an identity of this component cache. Content item popularity for component caches can be generated periodically or on an as-needed basis from the composite register by filtering register entries based on identity of component caches. Optionally, the composite register can include, for a content item, an indication of popularity from the perspective of component caches within the composite cache where the content item is not necessarily currently stored.

In various embodiments of the present invention, when new content is to be placed in a composite cache (cluster), but a component cache of the cluster is not specified, a determination of a component cache in which to store the content may be made. In some embodiments, the component cache may be selected based on proximity to the UE which last requested the content. In some embodiments, the component cache may be selected based on proximity to a group of UEs which are expected to request the content. In some embodiments, when the cluster includes component caches at multiple cache levels, the component cache may be selected on a desired breadth of distribution of the content.

Various methods as disclosed herein may be implemented on one or more real or virtual computing devices, such as devices within a communication network control plane, devices operating in the data plane, or a combination thereof. Computing devices used to implement operations as described herein may include a processor operatively coupled to memory, the memory providing instructions for execution by the processor to perform the method as described herein. A cache may include computer memory for storing items of data content, a network communication interface to communicate with other nodes of the communication network via one or more protocols as would be readily understood by a worker skilled in the art, a microprocessor, and further computer memory storing program instructions for execution by the microprocessor in order to cause the cash to operate as described herein. The microprocessor and further computer memory may correspond to the cache controller. Alternatively to a microprocessor executing instructions stored in computer memory, other control means, such as application specific integrated circuits, electronic hardware and/or firmware may be provided to implement this task.

In some embodiments the in-network caches, cache clusters, controllers thereof, and/or CCFMs can be configured with sufficient functionality to enable instantiation of their respective functionality on an as-needed basis according to current processing requirements. These may, for example, be realized as virtual network functions (VNFs) within a Network Function Virtualization (NFV) framework. For example, a VNF corresponds to a function enabling operation of a communication network. For example a VNF can provide the functions of a cache, cache controller, router, switch, gateway, firewall, load balancer, server, mobility management entity, and the like. The function is virtualized in the sense that it may utilize a set of virtual resources, such as computing, storage and networking resources, rather than utilizing dedicated hardware resources. As such, VNF may be instantiated on an as-needed basis using available virtual resources. NFV and virtual network functions architecture is described in ETSI GS NFV-SWA 001, for example.

In some embodiments the in-network caches, cache clusters, controllers thereof, and/or CCFMs may comprise software defined networking (SDN) components, or programs deployed on the same or differing device platforms of the communication network. SDN is an architectural framework for creating intelligent programmable networks, where the control planes and the data planes are decoupled, network intelligence and state are logically centralized, and the underlying network infrastructure is abstracted from the application. In embodiments of the present invention, the control plane may use customer information and provide information to form a network logical topology, for example as created via software defined toplogy (SDT). The SDT can be combined with the SDN and software defined protocol (SDP) to create a customized virtual network (VN). A VN is a collection of resources virtualized for a particular service. Customers include users of services via a UE, terminal, or other customer device. Providers include service providers, VN operators, and other providers of services over the wireless network.

As a separate matter, SDN allows for the management of network services through abstraction of lower-level functionality. Control functions may be separated from forwarding functions for example by controlling the forwarding nodes from a control element. NFV can facilitate the virtualization of entire classes of network node functions. VNF can comprise or operate on one or more virtual machines running on relatively generic servers or computing equipment, such as commercial off-the-shelf hardware capable of being configured to provide a variety of functionalities, as opposed to dedicated hardware for a given functionality.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for managing data content items in a communication network, the method comprising:
   maintaining a plurality of registers for indexing data content items stored or to be stored in a same first cache, wherein each of said plurality of registers is associated with a different category, wherein each of the plurality of registers is an index comprising entries which are pointers to locations in the first cache which store the data content items, the plurality of registers including a register for indexing fresh data content items newly arrived at the first cache, a register for indexing more popular data content items, and a register for indexing less popular data content items;
   receiving an indication of one of the data content items;
   determining one of the plurality of registers to be used for indexing said one of the data content items, wherein said determining is based on one or more parameters associated with said one of the data content items, and wherein at least one of the one or more parameters is indicative of one or both of: relative popularity of said one of the data content items; and time since arrival of said one of the data content items;
   assigning said one of the data content items to the category associated to said determined one of the plurality of registers;
   indexing said one of the data content items using said determined one of the plurality of registers by creating an entry in said determined one of the plurality of registers that identifies a location, in the first cache, which stores the one of the data content items, wherein the location in the first cache is independent of which one of the plurality of registers includes the entry;
   repeating, for each respective one of said data content items, said determining and said indexing such that each register of the plurality of registers comprises a plurality of entries and each of said plurality of registers indexes a plurality of the data content items, and further such that different entries of a given one of the plurality of registers index different respective ones of the plurality of data content items;
   accessing each of the plurality of registers by a different corresponding one of a plurality of processing routines; and
   providing the entry for use in delivery of said one of the data content items in response to a request for said one of the data content items.

2. The method of claim 1, wherein the first cache belongs to a cache cluster comprising a plurality of caches, the method further comprising selecting one of the plurality of caches for storing a further data content item based at least partially on popularity of the further data content item, and initiating storage of the further data content item in the selected one of the plurality of caches.

3. The method of claim 1, further comprising, for a first one of the plurality of registers, estimating popularity of all data content items indexed by said first one of the plurality of registers using a first one of a plurality of popularity estimation methods, and for a second one of the plurality of registers, estimating popularity of all data content items indexed by said second one of the plurality of registers using a second one of the plurality of popularity estimation methods which is different from the first one of the plurality of popularity estimation methods.

4. The method of claim 3, wherein popularity of data content items indexed by a first one of the plurality of registers is estimated in a different manner, at a different frequency, or a combination thereof, relative to popularity of data content items indexed by a second one of the plurality of registers.

5. The method of claim 1, further comprising estimating popularity of data content items indexed by at least one of the plurality of registers.

6. The method of claim 5, further comprising updating the one or more parameters of data content items based on the estimated popularity of data content items.

7. The method of claim 5, wherein estimating popularity of data content items includes estimating popularity of said one of the data content items, the method further comprising adjusting which one of the plurality of registers is used to index said one of the plurality of registers based on the estimated popularity of said one of the data content items.

8. The method of claim 1, wherein when said one of the data content items is already indexed using a first one of the plurality of registers, indexing said one of the data content items using said determined one of the plurality of registers comprises moving a reference to said one of the data content items to a second one of the plurality of registers.

9. The method of claim 1, further comprising:
initially indexing said one of the plurality of data content items using a first register;
estimating popularity of said one of the plurality of data content items in a first manner corresponding to the first register;
indexing said one of the plurality of data content items using a second register reserved for more popular data content when the estimated popularity of said one of the plurality of data content items is above a first predetermined threshold; and
indexing said one of the plurality of data content items using a third register reserved for less popular data content when estimated popularity of said one of the plurality of data content items is at or below the first predetermined threshold.

10. The method of claim 1, further comprising estimating popularity of said one of the plurality of data content items and deleting said one of the plurality of data content items from the first cache when said estimated popularity is below a predetermined threshold.

11. The method of claim 10, further comprising deleting said one of the plurality of data content items based upon identifying a need to free memory space in the first cache.

12. A controller for managing data content items in a communication network, the controller comprising:
a plurality of registers for indexing data content items stored or to be stored in a same first cache, wherein each of said plurality of registers is associated with a different category, wherein each of the plurality of registers is an index comprising entries which are pointers to locations in the first cache which store the data content items, the plurality of registers including a register for indexing fresh data content items newly arrived at the first cache, a register for indexing more popular data content items, and a register for indexing less popular data content item; and
a processor configured to:
receive an indication of one of the data content items;
determine one of the plurality of registers to be used for indexing said one of the data content items, wherein said determining is based on one or more parameters associated with said one of the data content items, and wherein at least one of the one or more parameters is indicative of one or both of: relative popularity of said one of the data content items; and time since arrival of said one of the data content items;
assign said one of the data content items to the category associated to said determined one of the plurality of registers;
index said one of the data content items using said determined one of the plurality of registers by creating an entry in said determined one of the plurality of registers that identifies a location, in the first cache, which stores the one of the data content items, wherein the location in the first cache is independent of which one of the plurality of registers includes the entry;
repeat, for each respective one of said data content items, said determining and said indexing such that each register of the plurality of registers comprises a plurality of entries and each of said plurality of registers indexes a plurality of the data content items, and further such that different entries of a given one of the plurality of registers index different respective ones of the plurality of data content items;
access each of the plurality of registers by a different corresponding one of a plurality of processing routines; and
provide the entry for use in delivery of said one of the data content items in response to a request for said one of the data content items.

13. The controller of claim 12, wherein the first cache belongs to a cache cluster comprising a plurality of caches, the processor further configured to select one of the plurality of caches for storing a further data content item based at least partially on popularity of the further data content item, and to initiate storage of the further data content item in the selected one of the plurality of caches.

14. The controller of claim 12, further comprising a plurality of popularity estimators, each of the popularity estimators associated with a respective one of the plurality of registers and configured to estimate popularity of data content items indexed using said respective one of the plurality of registers.

15. The controller of claim 14, wherein the plurality of popularity estimators estimate popularity of data content in different manners relative to each other, at different frequencies relative to each other, or a combination thereof.

16. The controller of claim 12, further comprising a popularity estimator configured to estimate popularity of data content items indexed using at least one of the plurality of registers.

17. The controller of claim 16, wherein the controller is further configured to update the one or more parameters based on output of the popularity estimator.

18. The controller of claim 16, wherein the controller is configured to determine said one of the plurality of registers to be used for indexing one of the data content items based on output of the popularity estimator.

19. The controller of claim 18, further configured, when said one of the data content items is already indexed using a first one of the plurality of registers, to index said one of the data content items using a second one of the plurality of registers by moving a reference to said one of the data content items to the second one of the plurality of registers.

20. The controller of claim 12, further configured to:
initially index said one of the data content items using a first register of the plurality of registers;
estimate popularity of said one of the data content items using a first popularity estimator corresponding to the first register;
index said one of the data content items using a second register of the plurality of registers, the second register reserved for more popular data content, when the estimated popularity of said one of the data content items is above a first predetermined threshold; and
index said one of the data content items using a third register of the plurality of registers, the third register reserved for less popular data content, when estimated popularity of said one of the data content items is at or below the first predetermined threshold.

21. The controller of claim 12, further configured to estimate popularity of said one of the data content items using a popularity estimator and delete said one of the data content items from the first cache when said estimated popularity is below a predetermined threshold.

22. The controller of claim 21, wherein deleting the data content item is based upon identifying a need to free memory space in the first cache.

* * * * *